(12) United States Patent
Yamamoto

(10) Patent No.: US 9,557,522 B2
(45) Date of Patent: Jan. 31, 2017

(54) LENS BARREL AND IMAGING APPARATUS

(71) Applicant: SONY CORPORATION, Tokyo (JP)

(72) Inventor: Tetsuro Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 125 days.

(21) Appl. No.: 14/475,843

(22) Filed: Sep. 3, 2014

(65) Prior Publication Data
US 2015/0070782 A1    Mar. 12, 2015

(30) Foreign Application Priority Data
Sep. 11, 2013  (JP) .................. 2013-188378

(51) Int. Cl.
G02B 15/14    (2006.01)
G02B 7/10    (2006.01)

(52) U.S. Cl.
CPC .................. G02B 7/10 (2013.01); G02B 7/102 (2013.01)

(58) Field of Classification Search
CPC ........... G02B 7/10; G02B 7/021; G03B 17/04; G03B 2217/002; G03B 2205/0046; G03B 2205/0069
USPC ........................................ 359/700
See application file for complete search history.

(56) References Cited

U.S. PATENT DOCUMENTS 6,349,173 B1 *  2/2002 Kanai .................... G03B 17/04
                                                                396/131

FOREIGN PATENT DOCUMENTS

JP    2008-003272 A    1/2008

* cited by examiner

Primary Examiner — Alicia M Harrington
(74) Attorney, Agent, or Firm — Chip Law Group

(57) ABSTRACT

A lens barrel includes a first barrel which rotates around an optical axis; and a second barrel which supports the first barrel to slide freely around the optical axis and to be movable in an optical axis direction. One of the barrels includes a cam follower, and a cam groove is formed in the other. When the first barrel rotates, the cam follower slides in the cam groove. The cam groove includes first and second sliding portions, and an inclination angle of the first sliding portion to the optical axis is smaller than that of the second sliding portion. When transitioning from the collapsed to the photographing state, the cam follower slides on the first sliding portion and the first barrel extends. When transitioning from the photographing to the collapsed state, the cam follower slides on the second sliding portion and the first barrel is incorporated in the second barrel.

11 Claims, 18 Drawing Sheets

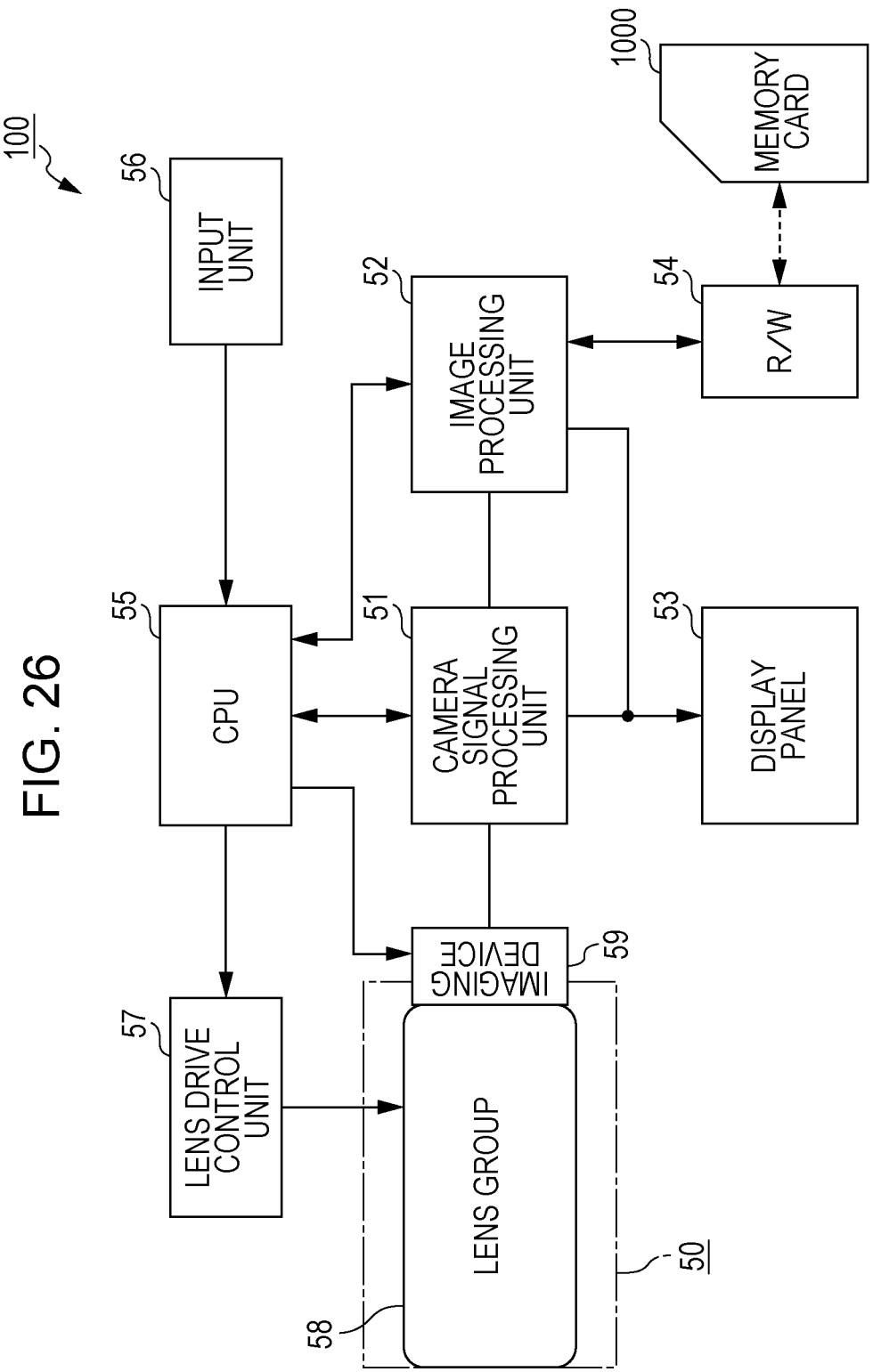

LENS BARREL AND IMAGING APPARATUS

CROSS REFERENCE TO RELATED APPLICATIONS

This application claims the benefit of Japanese Priority Patent Application JP 2013-188378 filed Sep. 11, 2013, the entire contents of which are incorporated herein by reference.

BACKGROUND

The present disclosure relates to a lens barrel that expands and contracts between a collapsed state and a photographing state, and relates to the technical field of an imaging apparatus provided with the lens barrel.

Of various imaging apparatuses such as a video camera or a still camera, there is a so-called collapsible-type imaging apparatus (for example, refer to Japanese Unexamined Patent Application Publication No. 2008-3272) in which a lens barrel is provided to freely expand and contract. A photographic optical system containing various optical components and optical elements such as a lens group is disposed in the inner portion of the lens barrel. The lens barrel can be stored in an apparatus body while not photographing; and a zoom ratio can be changed by extending the lens barrel from the apparatus body while photographing.

During usage, such as starting photography, the lens barrel is extended and transitions from the collapsed state to the photographing state. During non-usage, such as ending photography, the lens barrel is contracted and transitions from the photographing state to the collapsed state.

The collapsible-type imaging apparatus is provided with a plurality of annular barrels, and the lens barrel expands and contracts by moving in an optical axis direction while a predetermined barrel is rotated in a direction around the optical axis by a drive force of an actuator.

Such an imaging apparatus is capable of achieving both miniaturization (thinning) while not photographing and secured favorable optical performance while photographing due to the provision of the collapsible-type lens barrel.

In a collapsible-type lens barrel such as the one described above, a cam follower which is provided on a predetermined barrel is engaged with a cam groove, which is formed in another barrel and is inclined in relation to the optical axis, to slide freely. The lens barrel is moved in the optical axis direction by the cam follower of the barrel that is rotated by the drive force of the actuator sliding in the cam groove.

In the imaging apparatus including a collapsible-type lens barrel disclosed in Japanese Unexamined Patent Application Publication No. 2008-3272, the cam follower is prevented from detaching from the cam groove when a load is applied to the lens barrel by forming an escape path in the cam groove and ensuring that the cam follower engages with the escape path when a load is applied to the lens barrel in the optical axis direction.

As described above, in the collapsible-type lens barrel, since a configuration is adopted in which the cam follower is engaged with the cam groove to slide freely and a predetermined barrel is moved in the optical axis direction while rotating, the cam groove is inclined by a predetermined angle in relation to the optical axis.

SUMMARY

However, the smaller the inclination angle of the cam groove is in relation to the optical axis, the greater the operational load on the barrel becomes in relation to movement in the optical axis direction, and the greater the increase in the load on the actuator.

Meanwhile, when the inclination angle of the cam groove in relation to the optical axis is increased in consideration of the operational load on the barrel in relation to movement in the optical axis direction, the starting time of the imaging apparatus from the collapsed state to the photographing state when the power is turned on in order to start photographing is increased, and there is a concern that inconveniences such as missing a photographic chance will occur.

Therefore, it is desirable that the lens barrel and the imaging apparatus of an embodiment of the present disclosure surmount the problems described above, and achieve a reduction in startup time in addition to reducing the load on the actuator to a minimum.

First, according to an embodiment of the present disclosure, there is provided a lens barrel capable of expanding and contracting between a collapsed state in which an optical path is shortest and a photographing state in which the optical path is longer than in the collapsed state including a first barrel which is rotated around an optical axis by an actuator; and a second barrel which supports the first barrel to slide freely around the optical axis and to be capable of moving in an optical axis direction. One of the first barrel and the second barrel is provided with a cam follower, and a cam groove with which the cam follower engages to slide freely is formed in the other. When the first barrel rotates around the optical axis, the cam follower slides in the cam groove, thereby allowing the first barrel to move in the optical axis direction in relation to the second barrel.

The cam groove includes a first sliding portion and a second sliding portion which are both inclined in relation to the optical axis, and an inclination angle of the first sliding portion in relation to the optical axis is smaller than an inclination angle of the second sliding portion in relation to the optical axis. When transitioning from the collapsed state to the photographing state, the cam follower slides on the first sliding portion and the first barrel extends in relation to the second barrel. When transitioning from the photographing state to the collapsed state, the cam follower slides on the second sliding portion and the first barrel is incorporated in the second barrel.

Accordingly, the time taken when transitioning from the collapsed state to the photographing state is reduced, and the necessary drive force of the actuator when transitioning from the photographing state to the collapsed state is less than the necessary drive force of the actuator when transitioning from the collapsed state to the photographing state.

Second, it is desirable that the lens barrel described above further include an energizing portion which energizes the first barrel in a direction in which the first barrel extends in relation to the second barrel.

Accordingly, the first barrel is extended in relation to the second barrel by the combined forces of the drive force of the actuator and the energizing force of the energizing portion.

Third, in the lens barrel described above, it is desirable that a spring member be used as the energizing portion. Accordingly, the first barrel is extended in relation to the second barrel by the combined forces of the drive force of the actuator and the energizing force of the spring member.

Fourth, in the lens barrel described above, it is desirable that a magnet be used as the energizing portion. Accordingly, the first barrel is extended in relation to the second barrel by the combined forces of the drive force of the actuator and the energizing force of the magnet.

Fifth, in the lens barrel described above, it is desirable that a photographing state forming portion, which extends in a direction orthogonal to the optical axis and with which the cam follower engages in the photographing state, be formed in the cam groove, that an intersection with the first sliding portion be formed in a middle portion of the photographing state forming portion, and that an intersection with the second sliding portion be formed on an end portion of the photographing state forming portion. Accordingly, the photographing state forming portion is formed in a linear shape, and the cam follower can easily slide in the photographing state forming portion toward the second sliding portion.

Sixth, in the lens barrel described above, it is desirable that a collapsed state forming portion, which extends in a direction orthogonal to the optical axis and with which the cam follower engages in the collapsed state, be formed in the cam groove, that an intersection with the second sliding portion be formed in a middle portion of the collapsed state forming portion, and that an intersection with the first sliding portion be formed on an end portion of the collapsed state forming portion. Accordingly, the collapsed state forming portion is formed in a linear shape, and the cam follower can easily slide in the collapsed state forming portion toward the first sliding portion.

Seventh, in the lens barrel described above, it is desirable that a photographing state forming portion, which extends in a direction orthogonal to the optical axis and with which the cam follower engages in the photographing state, be formed in the cam groove, that an intersection with the first sliding portion be formed in a middle portion of the photographing state forming portion, that an intersection with the second sliding portion be formed on an end portion of the photographing state forming portion, that, in a bottom surface of the photographing state forming portion, a groove-shaped guide portion be formed at a position crossing the intersection with the first sliding portion, that a guided portion be provided in the cam follower to be capable of moving in a depth direction of the cam groove, and that, when the cam follower slides in the photographing state forming portion toward the second sliding portion, the guided portion be inserted into the guide portion and slide. Accordingly, when the cam follower slides in the photographing state forming portion, the guided portion is inserted into the guide portion and the cam follower is guided by the guide portion.

Eighth, it is desirable that the lens barrel described above further include a pushing spring which energizes the guided portion in a direction in which the guided portion is pushed against a bottom surface of the cam groove. Accordingly, when the cam follower slides in the photographing state forming portion, the guided portion is inserted into the guide portion by the energizing force of the pushing spring.

Ninth, in the lens barrel described above, it is desirable that a collapsed state forming portion, which extends in a direction orthogonal to the optical axis and with which the cam follower engages in the collapsed state, be formed in the cam groove, that an intersection with the second sliding portion be formed in a middle portion of the collapsed state forming portion, that an intersection with the first sliding portion be formed on an end portion of the collapsed state forming portion, that, in a bottom surface of the collapsed state forming portion, a groove-shaped guide portion be formed at a position crossing the intersection with the second sliding portion, that a guided portion be provided in the cam follower to be capable of moving in a depth direction of the cam groove, and that, when the cam follower slides in the collapsed state forming portion toward the first sliding portion, the guided portion be inserted into the guide portion and slide. Accordingly, when the cam follower slides in the collapsed state forming portion, the guided portion is inserted into the guide portion and the cam follower is guided by the guide portion.

Tenth, it is desirable that the lens barrel described above further include a pushing spring which energizes the guided portion in a direction in which the guided portion is pushed against a bottom surface of the cam groove. Accordingly, when the cam follower slides in the collapsed state forming portion, the guided portion is inserted into the guide portion by the energizing force of the pushing spring.

According to another embodiment of the present disclosure, there is provided an imaging apparatus including a lens barrel, in an inner portion of which a photographic optical system is disposed, and an imaging device which converts an optical image that is acquired via the photographic optical system into an electrical signal. The lens barrel capable of expanding and contracting between a collapsed state in which an optical path is shortest and a photographing state in which the optical path is longer than in the collapsed state includes a first barrel which is rotated around an optical axis by an actuator; and a second barrel which supports the first barrel to slide freely around the optical axis and to be capable of moving in an optical axis direction. One of the first barrel and the second barrel is provided with a cam follower, and a cam groove with which the cam follower engages to slide freely is formed in the other. When the first barrel rotates around the optical axis, the cam follower slides in the cam groove, thereby allowing the first barrel to move in the optical axis direction in relation to the second barrel.

The cam groove includes a first sliding portion and a second sliding portion which are both inclined in relation to the optical axis, and an inclination angle of the first sliding portion in relation to the optical axis is smaller than an inclination angle of the second sliding portion in relation to the optical axis. When transitioning from the collapsed state to the photographing state, the cam follower slides on the first sliding portion and the first barrel extends in relation to the second barrel. When transitioning from the photographing state to the collapsed state, the cam follower slides on the second sliding portion and the first barrel is incorporated in the second barrel.

Accordingly, in the lens barrel, the time taken when transitioning from the collapsed state to the photographing state is reduced, and the necessary drive force of the actuator when transitioning from the photographing state to the collapsed state is less than the necessary drive force of the actuator when transitioning from the collapsed state to the photographing state.

According to the embodiments of the present disclosure, the time taken when transitioning from the collapsed state to the photographing state is reduced, and the necessary drive force of the actuator when transitioning from the photographing state to the collapsed state is less than the necessary drive force of the actuator when transitioning from the collapsed state to the photographing state. Therefore, it is possible to achieve a reduction in startup time in addition to reducing the load on the actuator to a minimum.

The effects disclosed in the present specification are merely examples, embodiments are not to be limited thereto and other effects may also be present.

BRIEF DESCRIPTION OF THE DRAWINGS

FIG. 14 is a schematic view showing an engagement position of the cam follower in relation to the cam groove, in the collapsed state before the power is turned on;

FIG. 26 is a block diagram of the imaging apparatus.

DETAILED DESCRIPTION OF EMBODIMENTS

Hereinafter, description will be given of an embodiment of the present disclosure, with reference to the attached drawings.

The embodiment shown hereinafter applies the imaging apparatus of an embodiment of the present disclosure to a still camera, and the lens barrel of an embodiment of the present disclosure to the lens barrel of the still camera.

Note that, the range of applications of the present disclosure is not limited to a still camera and a lens barrel provided on the still camera. For example, the present disclosure can be applied widely to various imaging apparatuses embedded in a video camera or other devices, and to the lens barrel which is provided on such an imaging apparatus.

In the description hereinafter, the directions front, rear, up, down, left and right are indicated as seen from the perspective of a photographer when photographing with the still camera. Therefore, the object side is the front, and the photographer side is the rear.

Note that, the directions front, rear, up, down, left and right indicated hereinafter are intended to facilitate explanation, and embodiments of the present disclosure are not limited to these directions.

The lens group indicated hereinafter may be configured of a singularity or a plurality of lenses, and may also include other optical elements such as an aperture or an iris in addition to the singularity or the plurality of lenses.

Configuration of Imaging Apparatus

First, description will be given of the schematic configuration of the imaging apparatus (refer to FIGS. 1 to 3).

Figure 1:
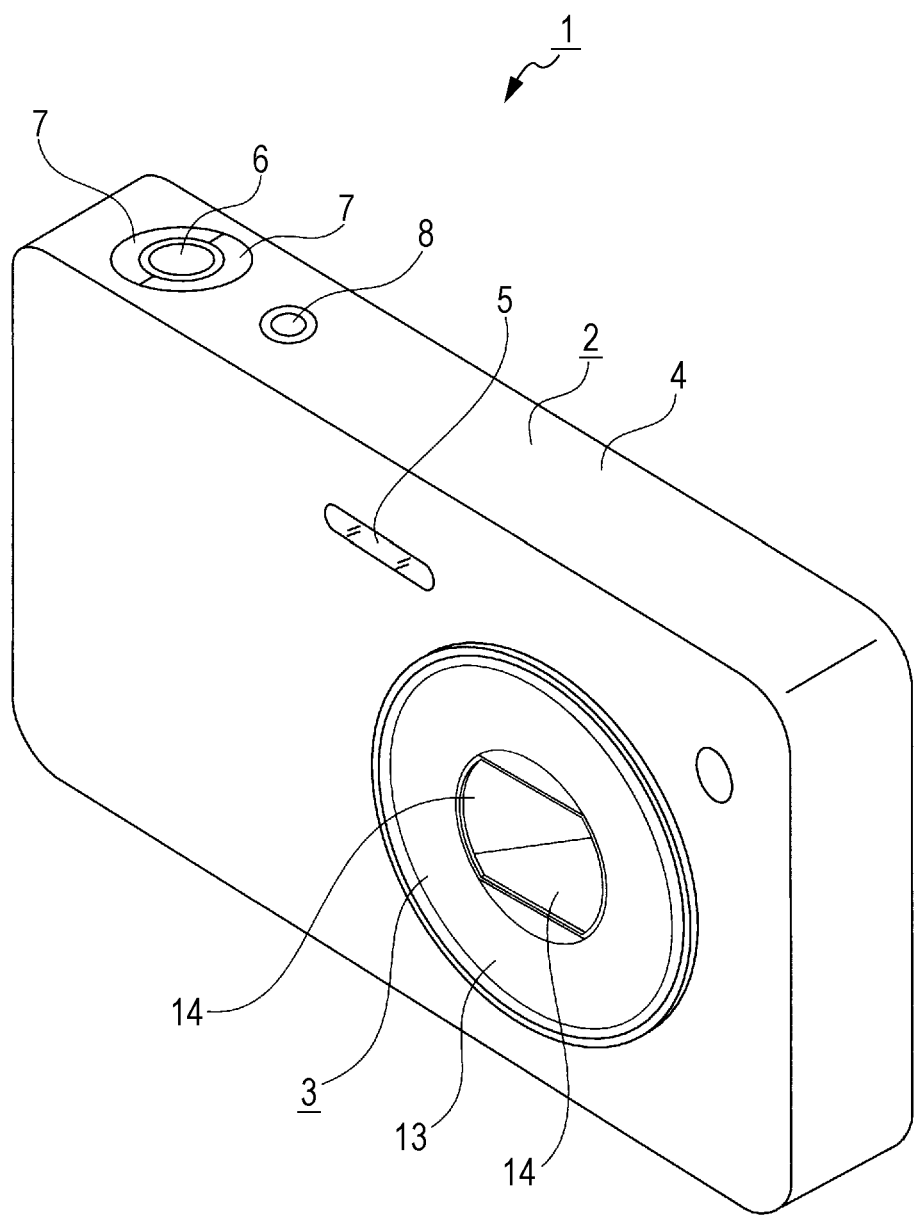
FIG. 1, together with FIGS. 2 to 26, shows an embodiment of a lens barrel and an imaging apparatus of an embodiment of the present disclosure, and is a perspective view of the imaging apparatus shown in a state in which the lens barrel is in the collapsed state.
Figure 2:
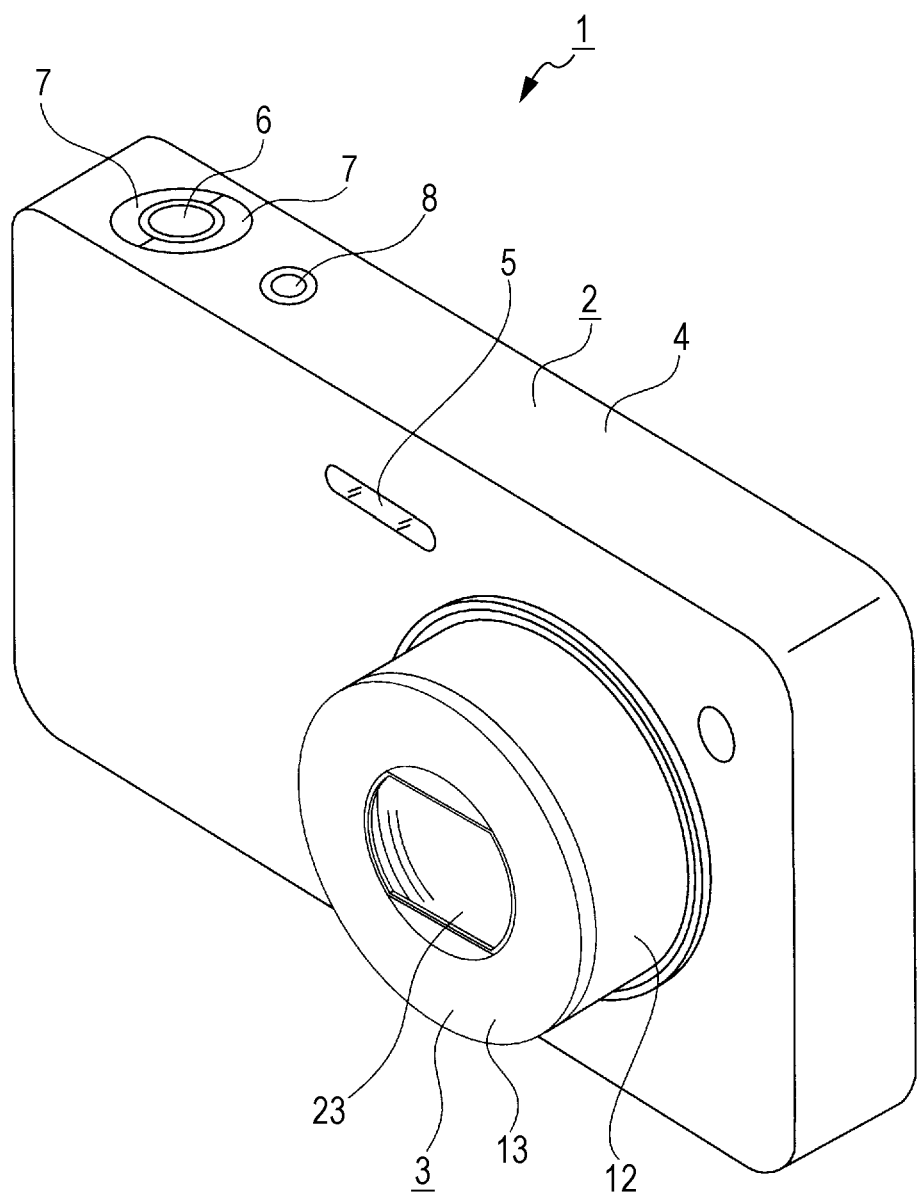
FIG. 2 is a perspective view of the imaging apparatus shown in a state in which the lens barrel is in the photographing state.

As shown in FIGS. 1 and 2, an imaging apparatus 1 is provided with an apparatus body 2 and a lens barrel 3 which is supported on the apparatus body 2 to freely expand and contract in the front and rear directions (the optical axis direction). The imaging apparatus 1 is a so-called collapsible-type in which the lens barrel 3 is stored in the apparatus body 2 while not photographing or the like (refer to FIG. 1), and the lens barrel 3 protrudes forward from the apparatus body 2 while photographing or the like (refer to FIG. 2). The lens barrel 3 expands and contracts between the collapsed state in which the lens barrel 3 is stored in the apparatus body 2 (refer to FIG. 1), and the photographing state in which the lens barrel 3 protrudes forward from the apparatus body 2 (refer to FIG. 2).

The collapsible-type imaging apparatus 1 is capable of achieving both miniaturization (thinning) while not photographing and secured favorable optical performance while photographing.

Figure 3:
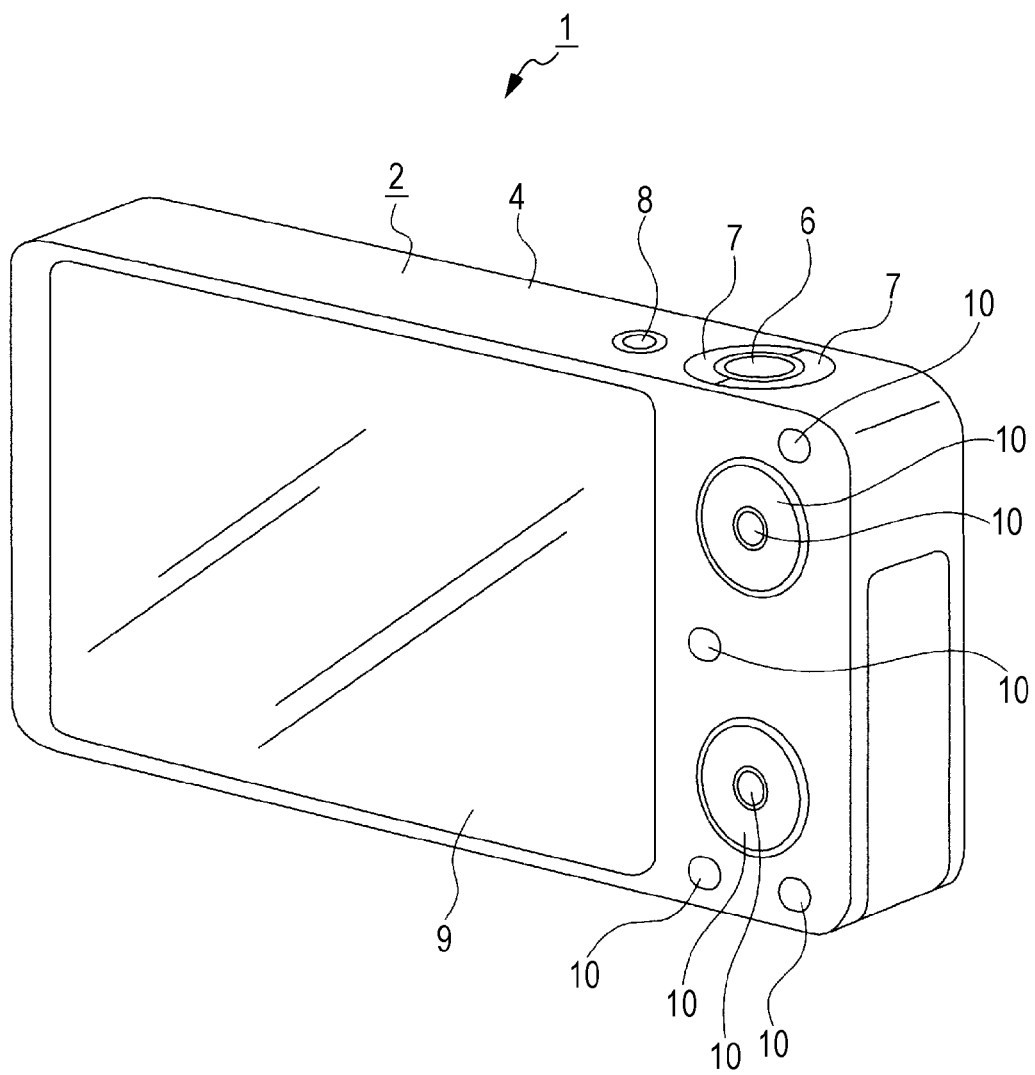
FIG. 3 is a perspective view showing the imaging apparatus in a state of being viewed from the opposite side from that in FIG. 1.

The apparatus body 2 is formed by various necessary components being disposed on the inside and outside of a wide, flat housing 4 (refer to FIGS. 1 to 3).

A flash 5 is provided on the front surface of the apparatus body 2. A shutter button 6, a zoom switch 7, and a power button 8 are provided on the top surface of the apparatus body 2. A display 9, and various operation portions 10, 10, . . . , are provided on the rear surface of the apparatus body 2.

Configuration of Lens Barrel

Hereinafter, description will be given of the configuration of the lens barrel 3 (refer to FIGS. 4 to 11).
Overall Schematic Configuration The lens barrel 3 includes a first barrel 11, a decorative ring 12, a barrier cover 13, barrier blades 14, 14, a bearing ring 15, a second barrel 16, a rear barrel 17, and a spring member 18 (refer to FIGS. 4 to 7).

Figure 7:
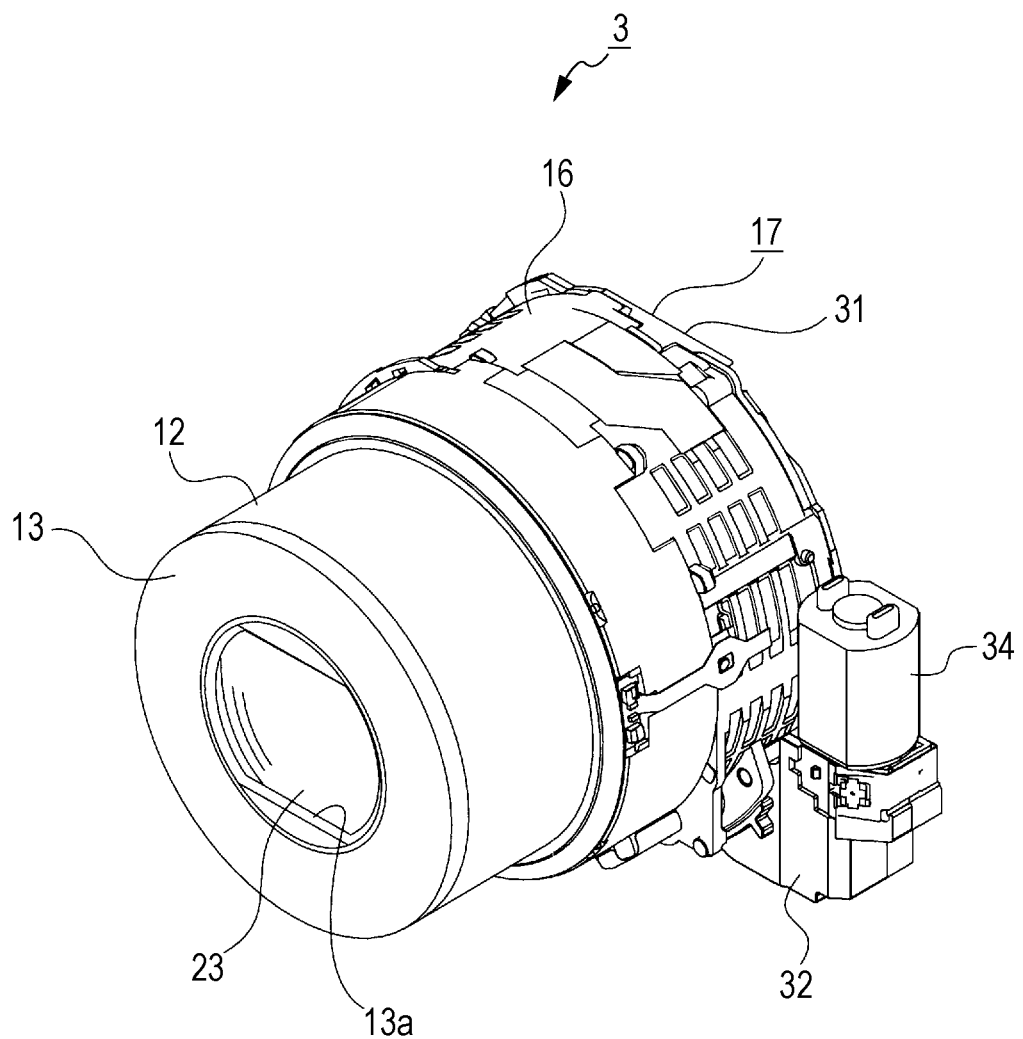
FIG. 7 is a perspective view of the lens barrel in the photographing state.

In regard to the lens barrel 3, in the collapsed state, the other components are incorporated and stored in the inner portion of the second barrel 16 (refer to FIG. 6), and in the photographing state, the components that are stored in the inner portion of the second barrel 16 are extended forward to protrude (refer to FIG. 7). The optical path length of the lens barrel 3 is shortest in the collapsed state, and the optical path length is longer in the photographing state than in the collapsed state.

Configuration of Components

Figure 4:
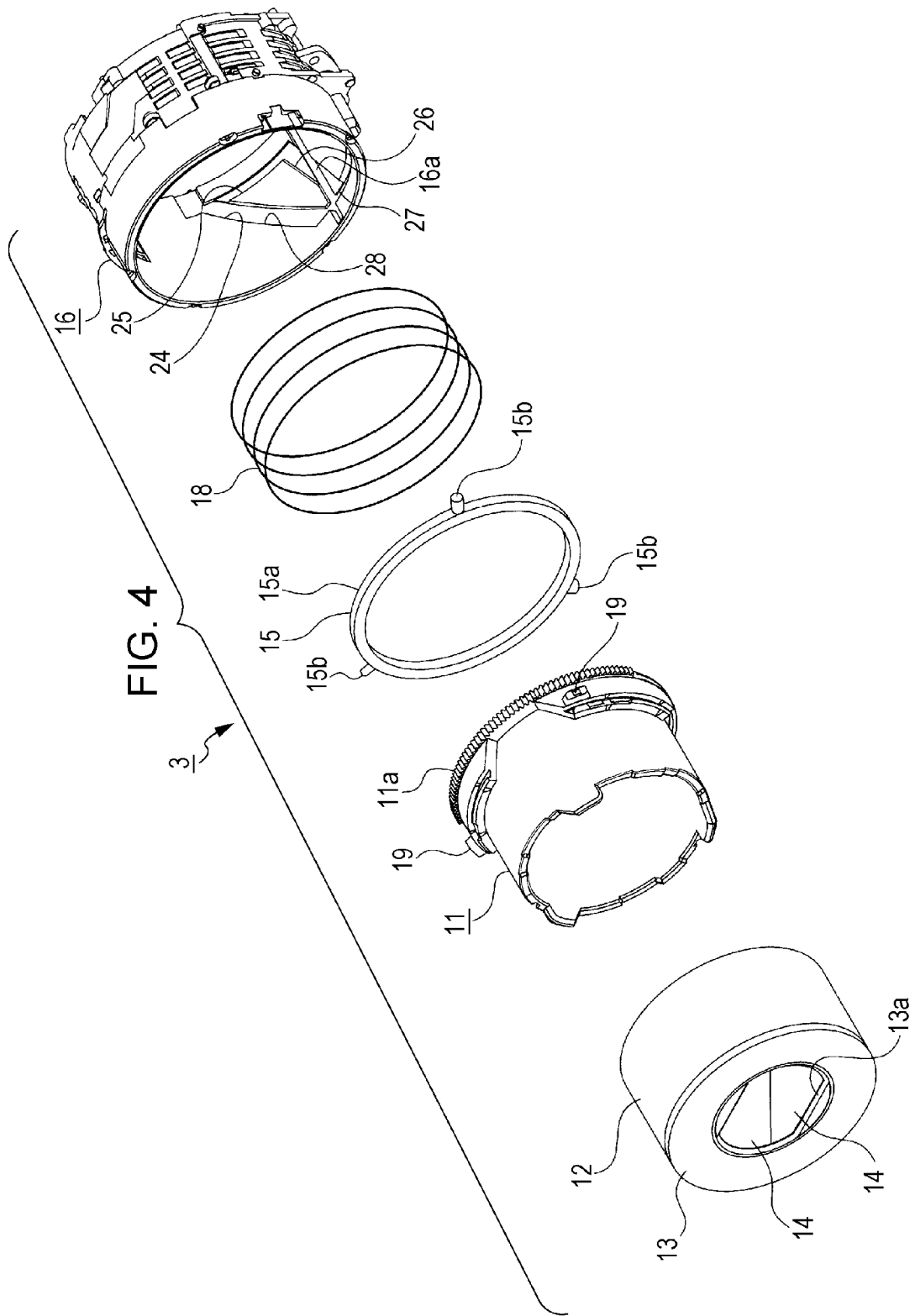
FIG. 4 is an exploded perspective view of the lens barrel with a portion thereof omitted.
Figure 5:
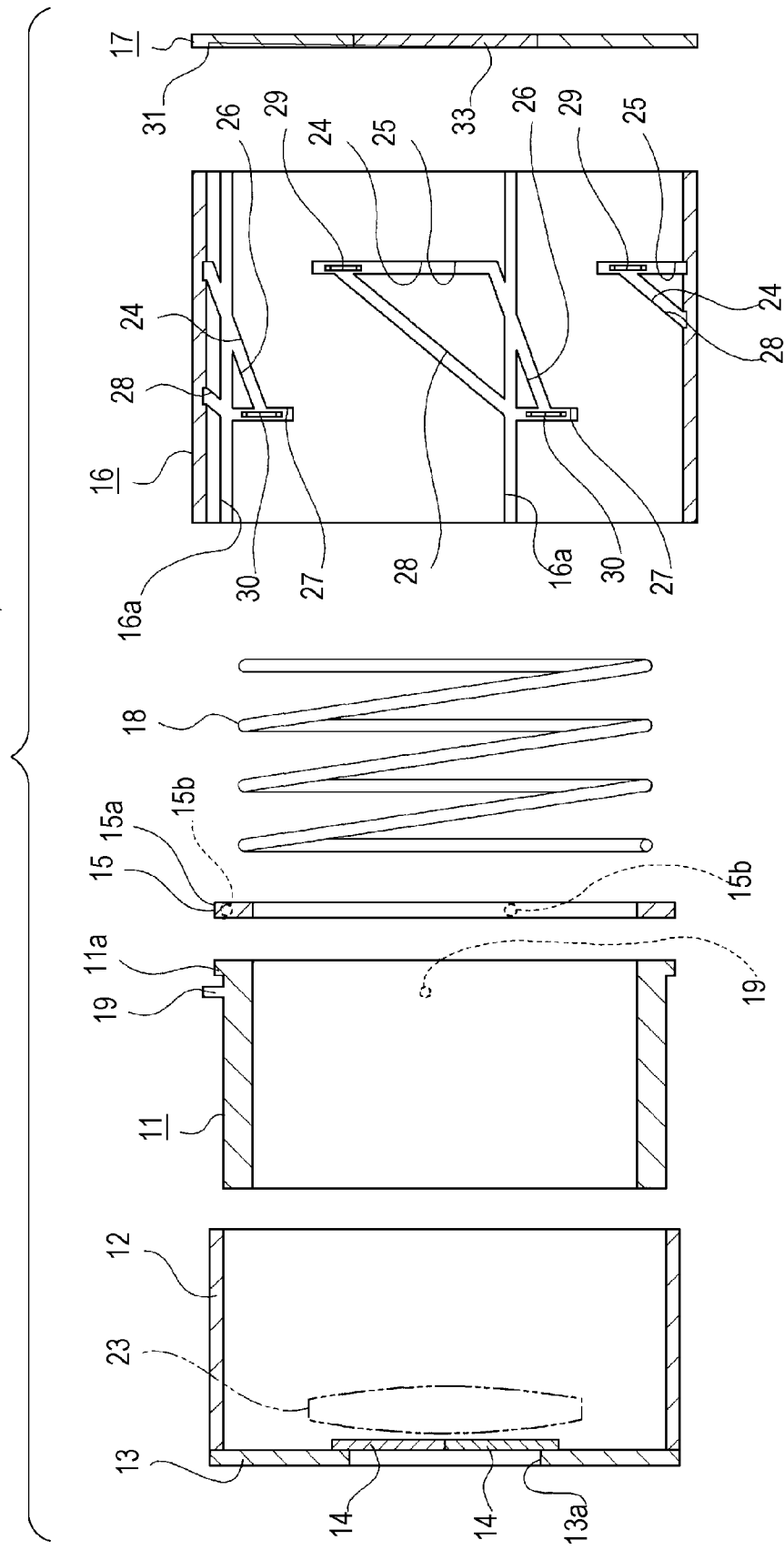
FIG. 5 is a schematic exploded cross-sectional view of the lens barrel.
Figure 6:
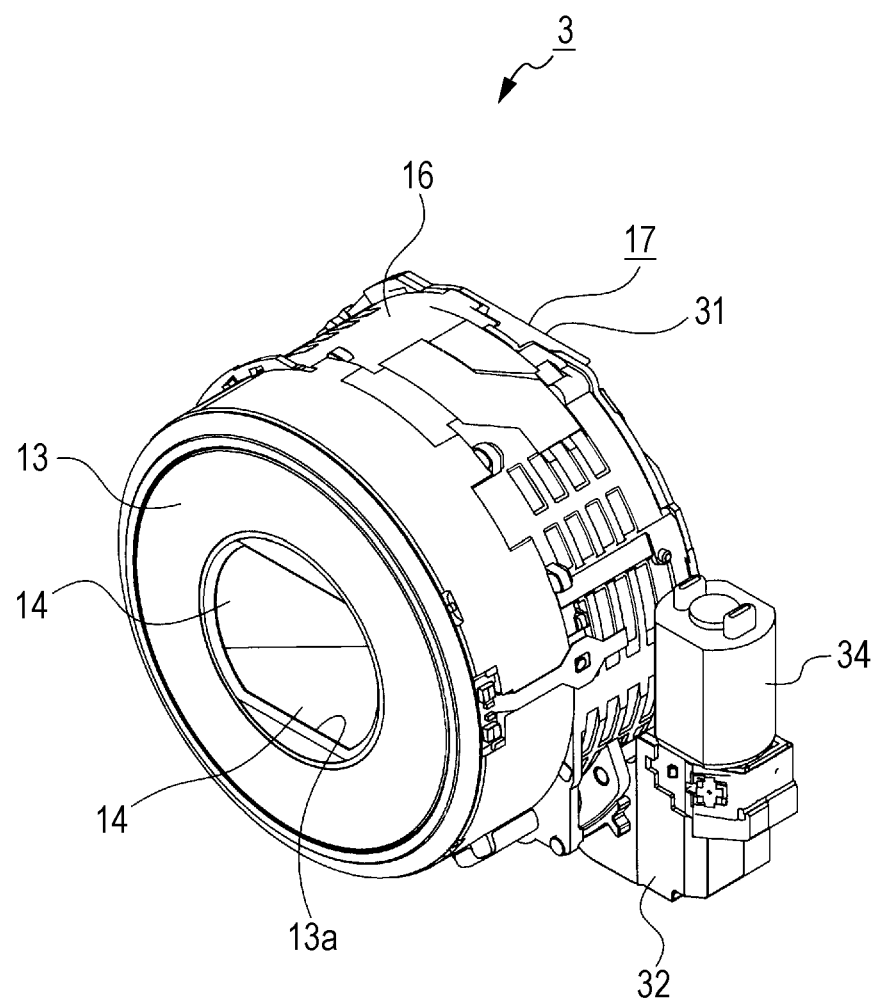
FIG. 6 is a perspective view of the lens barrel in the collapsed state.

The first barrel 11 is formed in a substantially cylindrical shape, and cam followers 19, 19, 19, which protrude outward, are provided spaced apart around the optical axis at a position of the first barrel 11 close to the rear end thereof (refer to FIGS. 4 and 5). A rack portion 11a which extends around the optical axis is provided on the rear end portion on the outer circumferential surface of the first barrel 11. The first barrel 11 is capable of rotating around the optical axis, and is capable of moving in the optical axis direction.

Figure 8:
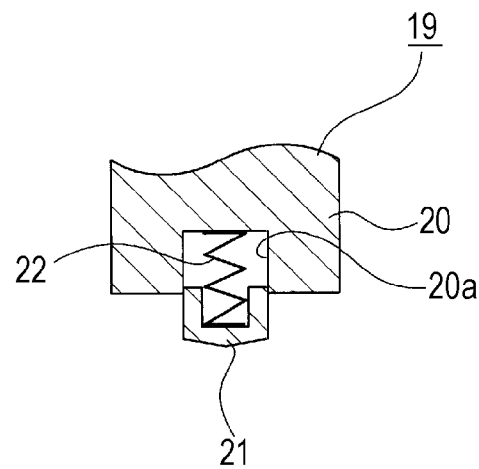
FIG. 8 is an enlarged cross-sectional view of a cam follower.

The cam follower 19 includes a sliding engagement portion 20 and a guided portion 21, which is capable of moving in the radial direction of the first barrel 11 in relation to the sliding engagement portion 20 (refer to FIG. 8).

A spring disposition hole 20a which is open to the outside is formed in the sliding engagement portion 20. A pushing spring 22 is disposed in the spring disposition hole 20a. The pushing spring 22 is a compressed coil spring, for example, and the sliding engagement portion 20 and the guided portion 21 are coupled by the pushing spring 22.

The guided portion 21 is set to a state in which at least a portion thereof is inserted in the spring disposition hole 20a, and the guided portion 21 is energized by the pushing spring 22 in a direction protruding from the spring disposition hole 20a.

The decorative ring 12 is formed in a cylindrical shape and is one size larger than the first barrel 11 (refer to FIGS. 4 and 5). The decorative ring 12 is disposed to cover the outer circumferential surface of the first barrel 11 except for the portion of the rear end side from the outside, may not be moved in the front and rear directions in relation to the first barrel 11, and can be rotated relative to the first barrel 11. Therefore, during the rotation of the first barrel 11 around the optical axis, the decorative ring 12 is rotated around the optical axis relative to the first barrel 11 and is moved integrally with the first barrel 11 in the optical axis direction.

The exterior of the barrier cover 13 is formed in a substantially circular shape and includes a substantially rectangular light transmission hole 13a. The barrier cover 13 is attached to the front end portion of the decorative ring 12.

The barrier blades 14, 14 are supported on the rear surface of the barrier cover 13 to freely open and close. The barrier blades 14, 14 are closed in the collapsed state and opened in the photographing state by an open-close mechanism (not shown). Therefore, in the collapsed state, the light transmission hole 13a of the barrier cover 13 is blocked by the barrier blades 14, 14 (refer to FIG. 6); and, in the photographing state, the light transmission hole 13a is opened by the barrier blades 14, 14 (refer to FIG. 7).

In the inner portion of the lens barrel 3, a plurality of lens groups, which include a imaging lens 23 that is positioned closest to the front side, are disposed spaced apart in the optical axis direction (refer to FIGS. 5 and 7), and light is incident to the imaging lens 23 from outside when the light transmission hole 13a is opened by the barrier blades 14, 14.

The exterior of the bearing ring 15 is formed in an annular shape to be approximately the same size as the rear end portion of the first barrel 11, and includes a supported portion 15a and guided pieces 15b, 15b, 15b which protrude outward from the supported portion 15a (refer to FIGS. 4 and 5). The guided pieces 15b, 15b, 15b are provided spaced apart around the optical axis.

The bearing ring 15 is supported on the rear surface of the first barrel 11, may not be moved in the front and rear directions in relation to the first barrel 11, and can be rotated around the optical axis relative to the first barrel 11. Therefore, during the rotation of the first barrel 11 around the optical axis, the bearing ring 15 is rotated around the optical axis relative to the first barrel 11 and is moved integrally with the first barrel 11 in the optical axis direction.

The second barrel 16 is formed in a substantially cylindrical shape, is one size larger than the decorative ring 12, and is disposed in a state of being fixed to the inner portion of the housing 4.

Rectilinear guide grooves 16a, 16a, 16a that extend to the front and rear are formed spaced apart around the optical axis on the inner circumferential surface of the second barrel 16. The guided pieces 15b, 15b, 15b of the bearing ring 15 are engaged with the rectilinear guide grooves 16a, 16a, 16a, respectively, to slide freely. Therefore, the bearing ring 15 is guided by the rectilinear guide grooves 16a, 16a, 16a, and is moved integrally with the first barrel 11 in the optical axis direction.

Cam grooves 24, 24, 24 are formed spaced apart around the optical axis on the inner circumferential surface of the second barrel 16.

Figure 9:
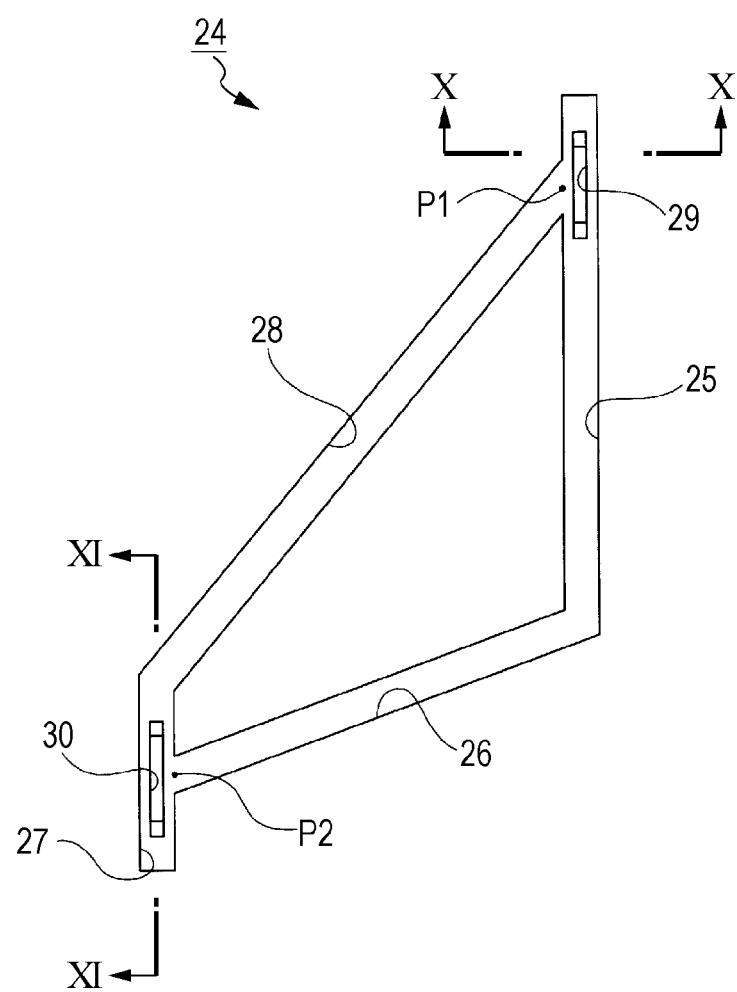
FIG. 9 is a schematic view of a cam groove.
Figure 10:
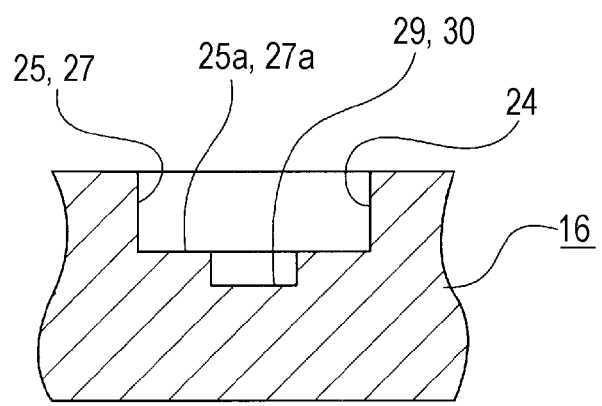
FIG. 10 is an enlarged cross-sectional view taken along the line X-X in FIG. 9.
Figure 11:
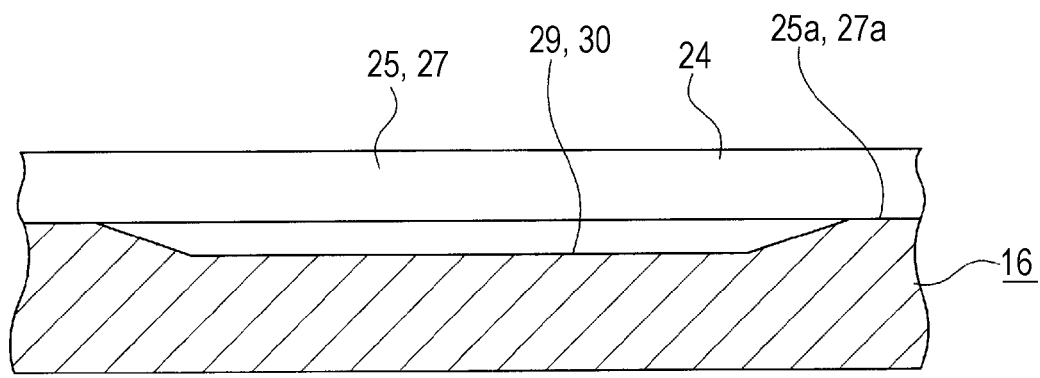
FIG. 11 is an enlarged cross-sectional view taken along the line XI-XI in FIG. 9.

The cam groove 24 includes a collapsed state forming portion 25 which is positioned closest to the rear side, a first sliding portion 26 which continues from an end portion of the collapsed state forming portion 25, a photographing state forming portion 27 which continues from an end portion of the first sliding portion 26 and is positioned closest to the rear side, and a second sliding portion 28 which continues from an end portion of the photographing state forming portion 27 (refer to FIG. 9).

The collapsed state forming portion 25 is formed in a state of extending in a direction orthogonal to the optical axis. The rear end portion of the photographing state forming portion 27 continues from the collapsed state forming portion 25 at a position close to the other end portion thereof, and the continuous portion is formed as an intersection P1. A groove-shaped first guide portion 29, which extends in a direction orthogonal to the optical axis, is formed on a bottom surface 25a of the collapsed state forming portion 25 at a position crossing the intersection P1. The first guide portion 29 is formed on the central portion in the width direction of the bottom surface 25a, both end portions in the longitudinal direction are inclined and the portion other than the end portions is deepest (refer to FIGS. 10 and 11).

The first sliding portion 26 is inclined in relation to the optical axis, the rear end portion thereof continues from an end portion of the collapsed state forming portion 25, and the front end portion continues from the photographing state forming portion 27 (refer to FIG. 9).

The photographing state forming portion 27 is formed in a state of extending in a direction orthogonal to the optical axis, and the length thereof in the longitudinal direction is shorter than the length in the longitudinal direction of the collapsed state forming portion 25. The front end portion of the first sliding portion 26 continues from the photographing state forming portion 27 at a position close to the other end portion thereof, and the continuous portion is formed as an intersection P2. A groove-shaped second guide portion 30, which extends in a direction orthogonal to the optical axis, is formed on a bottom surface 27a of the photographing state forming portion 27 at a position crossing the intersection P2. The second guide portion 30 is formed on the central portion in the width direction of the bottom surface 27a, both end portions in the longitudinal direction are inclined and the portion other than the end portions is deepest (refer to FIGS. 10 and 11).

The second sliding portion 28 is inclined in relation to the optical axis, the front end portion thereof continues from the photographing state forming portion 27, and the rear end portion continues from the collapsed state forming portion 25 (refer to FIG. 9). The inclination angle of the second sliding portion 28 in relation to the optical axis is greater than the inclination angle of the first sliding portion 26 in relation to the optical axis. Therefore, the inclination angle of the first sliding portion 26 in relation to the optical axis is smaller than the inclination angle of the second sliding portion 28 in relation to the optical axis, and the length in the longitudinal direction is shorter than the length in the longitudinal direction of the second sliding portion 28.

The cam followers 19, 19, 19 of the first barrel 11 are engaged with the cam grooves 24, 24, 24 of the second barrel 16, respectively, to slide freely. Note that, an introduction groove (not shown) is formed in order to cause the cam followers 19, 19, 19 to engage with the cam grooves 24, 24, 24 of the second barrel 16, respectively. The introduction groove continues from the end portion of the opposite side from the second sliding portion 28 of the photographing state forming portion 27, and is open to the front at the front end of the second barrel 16.

The rear barrel 17 includes a disk-shaped base surface portion 31 which substantially faces the front and rear directions, and a motor attachment portion 32 which is provided to continue from the outer circumferential portion of the base surface portion 31 (refer to FIGS. 5 to 7), and is disposed in a state of being fixed to the inner portion of the housing 4.

An imaging device 33 is attached to the central portion of the base surface portion 31. A transmission gear (not shown) which extends to the front and rear is supported on the outer circumferential portion of the base surface portion 31.

On the motor attachment portion 32, a drive motor is attached as an actuator 34, and a drive transmission portion (not shown) such as a gear or a worm is supported. The drive force of the actuator 34 is transmitted to the transmission gear via the drive transmission portion.

The transmission gear which is supported by the base surface portion 31 of the rear barrel 17 meshes with the rack portion 11a of the first barrel 11 in a state of being positioned on the inner portion of the second barrel 16. Therefore, the drive force of the actuator 34 is transmitted to the rack portion 11a via the drive transmission portion and the transmission gear, and the first barrel 11 rotates around the optical axis in relation to the second barrel 16.

When the first barrel 11 rotates around the optical axis, the cam followers 19, 19, 19 slide in the cam grooves 24, 24, 24, respectively. When the cam follower 19 slides in the collapsed state forming portion 25 or the photographing state forming portion 27 of the cam groove 24, the first barrel 11 does not move in the optical axis direction; and, when the cam follower 19 slides in the first sliding portion 26 or the second sliding portion 28 of the cam groove 24, the first barrel 11 moves in the optical axis direction.

Since the inclination angle of the first sliding portion 26 in relation to the optical axis is smaller than the inclination angle of the second sliding portion 28 in relation to the optical axis, the movement of the cam follower 19 in the optical axis direction is performed faster when the cam follower 19 is sliding on the first sliding portion 26 than when the cam follower 19 is sliding on the second sliding portion 28.

The spring member 18 is a compressed coil spring, for example, and the outer diameter thereof is formed to be approximately the same size as the outer diameter of the supported portion 15a of the bearing ring 15. Both end portions in the axis direction of the spring member 18 are disposed in the inner portion of the second barrel 16 in a state of being pushed against the supported portion 15a and the outer circumferential portion of the base surface portion 31 in the rear barrel 17, respectively. Therefore, the first barrel 11 is energized by the spring member 18 via the bearing ring 15 in the direction (forward) in which the first barrel 11 extends in relation to the second barrel 16, and the spring member 18 functions as an energizing portion which energizes the first barrel 11.

Operation of Lens Barrel when Zooming

Hereinafter, description will be given of the operations of the components of the lens barrel 3 when zooming (refer to FIGS. 12 to 24). Note that, when zooming, a predetermined lens group among the plurality of lens groups including the photographic lens 23 is moved in the optical axis direction by a mechanism (not shown); however, description of the movement of the lens group will be omitted.

Figure 12:
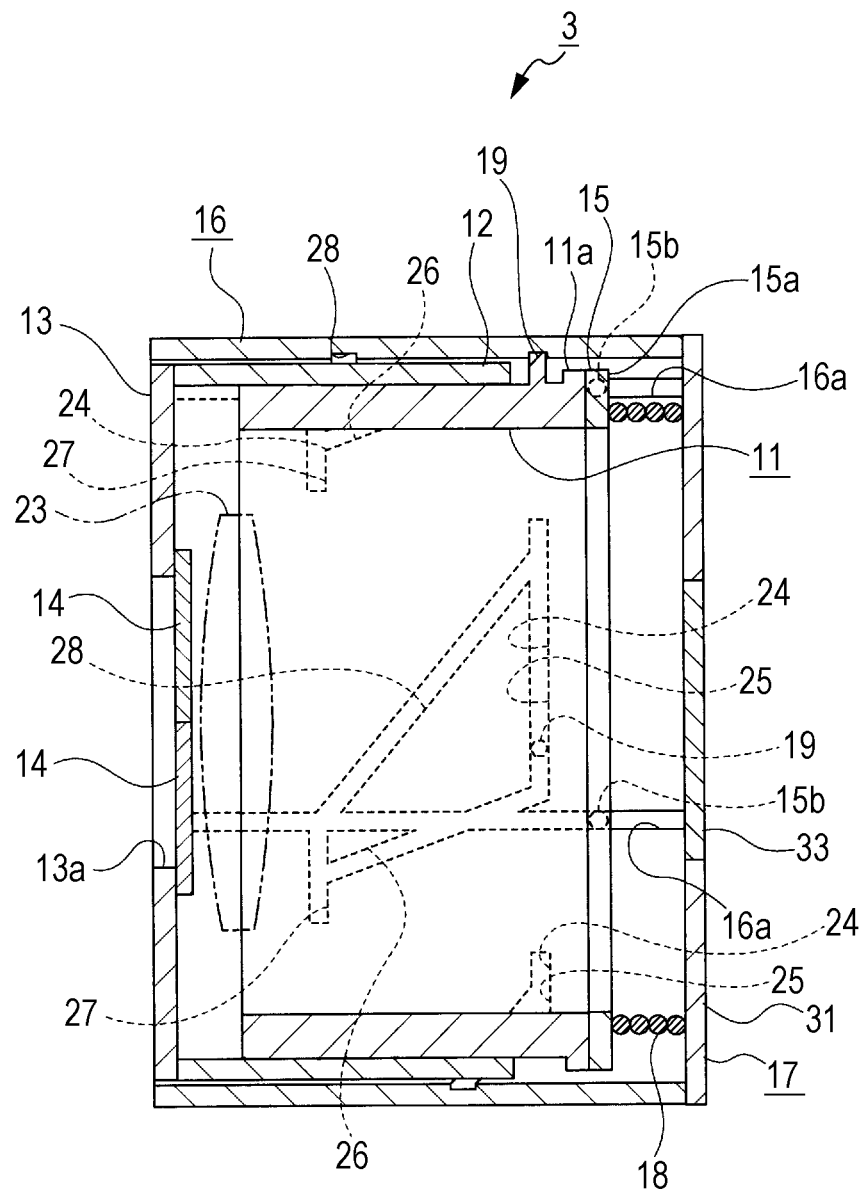
FIG. 12, together with FIGS. 13 to 24, shows an operation of the lens barrel, and is a schematic cross-sectional view of the lens barrel, showing the collapsed state.
Figure 13:
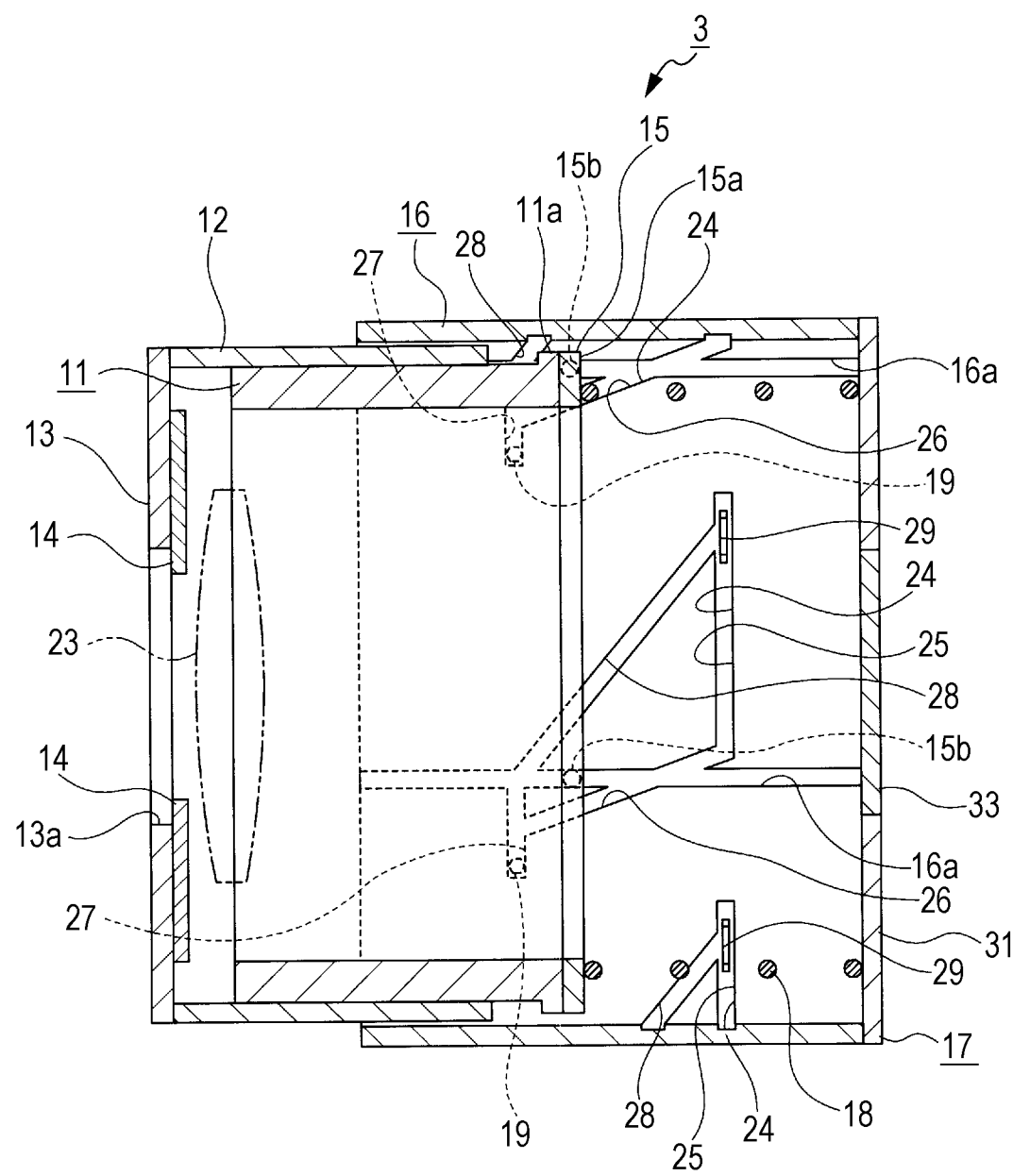
FIG. 13 is a schematic cross-sectional view of the lens barrel, showing the photographing state.

The lens barrel 3 which is configured as described above operates to expand and contract between the collapsed state (refer to FIGS. 6 and 12) and the photographing state (refer to FIGS. 7 and 13).

Figure 14:
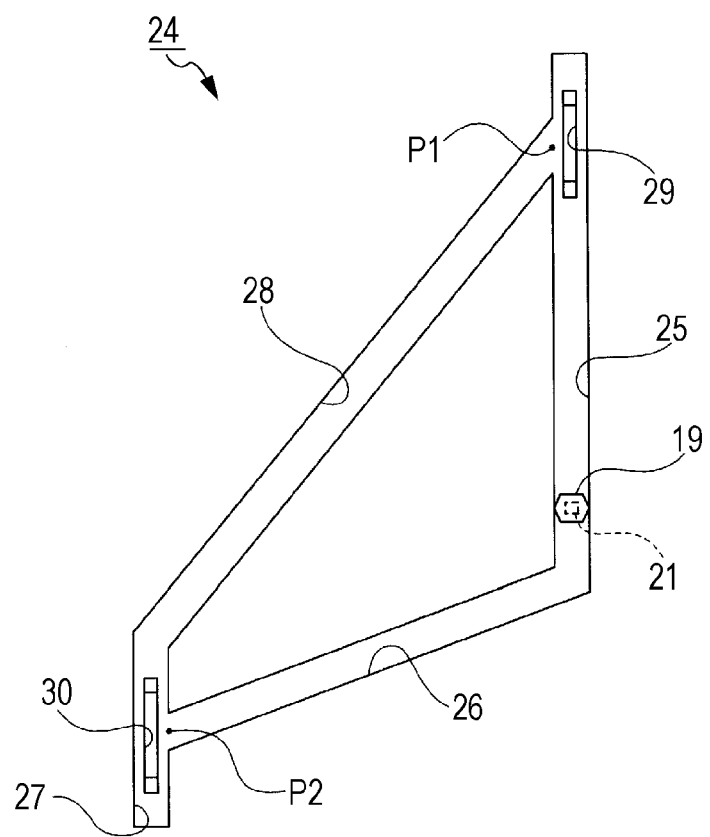
Figure 15:
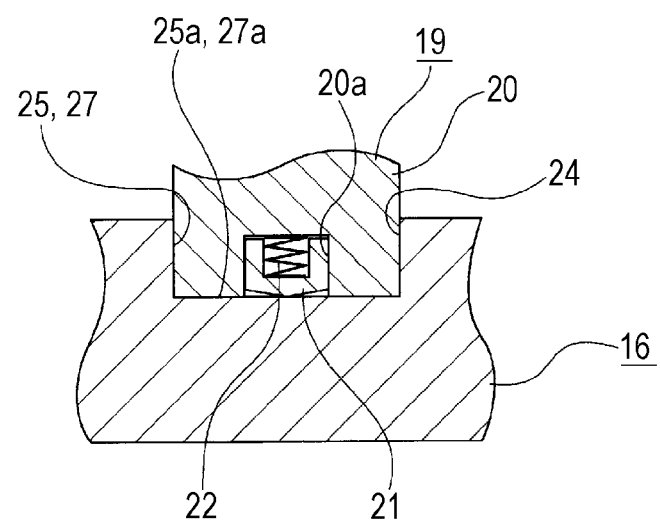
FIG. 15 is an enlarged cross-sectional view showing a state in which a guided portion of the cam follower is inserted in a spring disposition hole.
Figure 16:
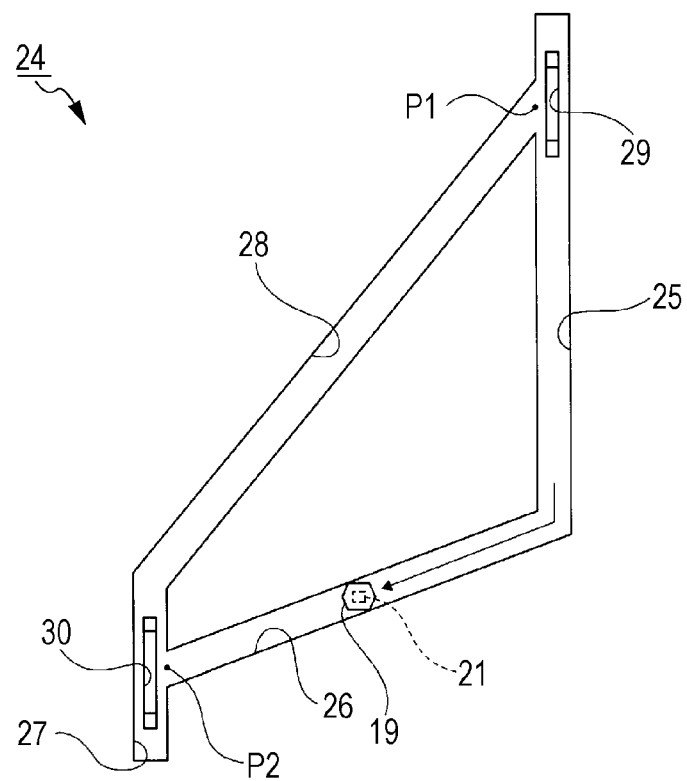
FIG. 16, continuing from FIG. 14, is a schematic view showing the engagement position of the cam follower in relation to the cam groove, in the middle of transitioning from the collapsed state to the photographing state.

In the collapsed state before the power is turned on (refer to FIG. 12), the cam followers 19, 19, 19 of the first barrel 11 are engaged with the collapsed state forming portions 25, 25, 25 in the cam grooves 24, 24, 24 of the second barrel 16, respectively, at positions close to the first sliding portions 26, 26, 26 (refer to FIG. 14). At this time, the guided portion 21 of the cam follower 19 is pushed against the bottom surface 25a of the collapsed state forming portion 25 by the energizing force of the pushing spring 22, and is positioned in the spring disposition hole 20a (refer to FIG. 15).

In the collapsed state, when the power is turned on by operating the power button 8 of the apparatus body 2, the first barrel 11 is rotated around the optical axis by the drive force of the actuator 34. When the first barrel 11 rotates around the optical axis, the cam follower 19 of the first barrel 11 slides from the collapsed state forming portion 25 to the first sliding portion 26 in the cam groove 24 of the second barrel 16 (refer to FIG. 16). When the cam follower 19 slides in the first sliding portion 26, the first barrel 11 moves forward (in the optical axis direction) at high speed in relation to the second barrel 16.

At this time, since the first barrel 11 is energized by the spring member 18 in the same direction as the movement direction thereof, the first barrel 11 is moved forward by the combined forces of the drive force of the actuator 34 and the energizing force of the spring member 18.

Therefore, even when the cam follower 19 slides in the first sliding portion 26, which has a small inclination angle in relation to the optical axis, it is possible to move the first barrel 11 without relying on a great drive force of the actuator 34, and it is possible to achieve miniaturization of the actuator 34 and to reliably perform the transition from the collapsed state to the photographing state.

Since the spring member 18 is used as the energizing portion, the structure of the energizing portion is simple, and it is possible to achieve miniaturization of the actuator 34 and to reliably perform the transition from the collapsed state to the photographing state without causing a sharp rise in manufacturing costs.

Figure 17:
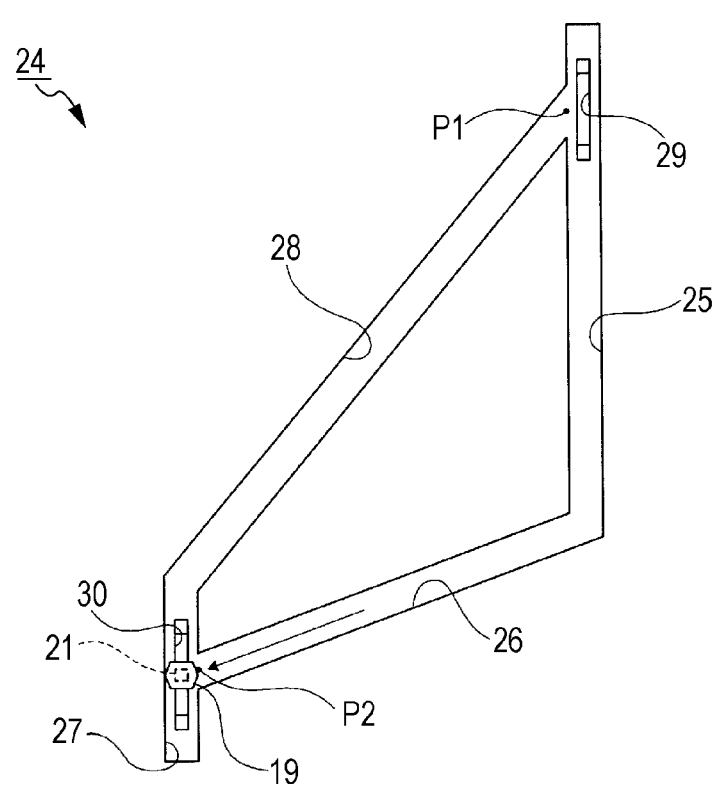
FIG. 17, continuing from FIG. 16, is a schematic view showing the engagement position of the cam follower in relation to the cam groove, after transitioning from the collapsed state to the photographing state.

The first barrel 11 continues to be rotated, and the cam follower 19 slides to the intersection P2 between the first sliding portion 26 and the photographing state forming portion 27 (refer to FIG. 17). The cam follower 19 slides to the intersection P2, thereby transitioning to the photographing state.

Figure 18:
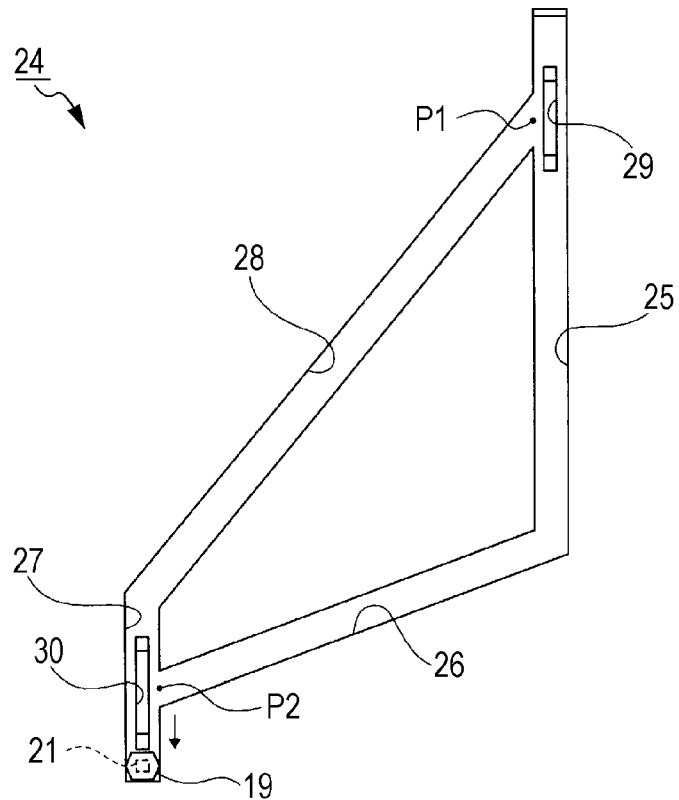
FIG. 18, continuing from FIG. 17, is a schematic view showing the engagement position of the cam follower in relation to the cam groove, when the photographing state is maintained.
Figure 19:
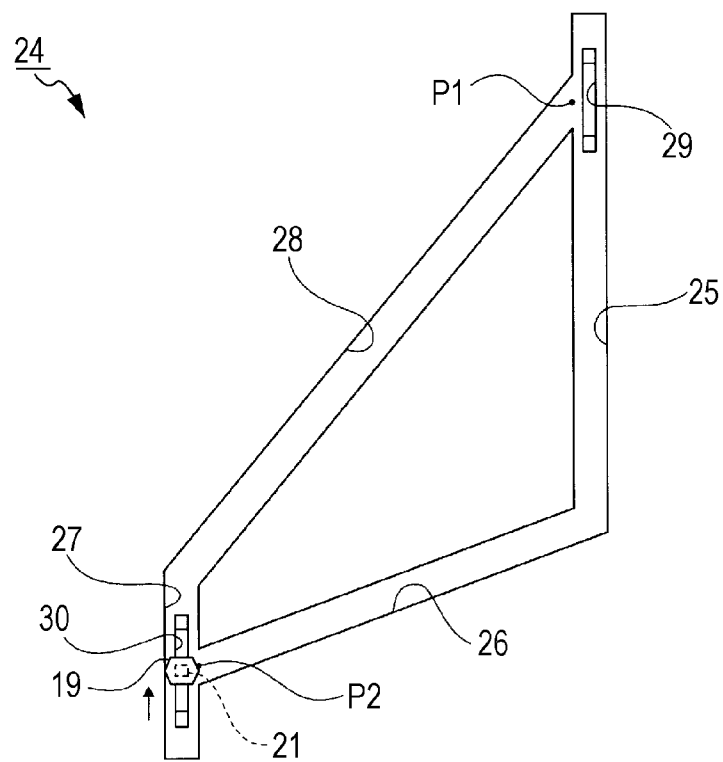
FIG. 19, continuing from FIG. 18, is a schematic view showing the engagement position of the cam follower in relation to the cam groove, when the guided portion is being guided by a guide portion.

Next, the cam follower 19 slides in the photographing state forming portion 27 to the end portion of the opposite side from the second sliding portion 28 side (refer to FIG. 18). When the cam follower 19 slides in the photographing state forming portion 27, the first barrel 11 moves in the optical axis direction.

When the cam follower 19 slides in the photographing state forming portion 27 to the end portion of the opposite side from the second sliding portion 28 side, the actuator 34 stops, and the lens barrel 3 is maintained in the photographing state in which the first barrel 11 extends from the second barrel 16 (refer to FIG. 13).

In the photographing state, the user can perform a necessary operation such as the photography of the object in relation to the apparatus body 2.

Meanwhile, in the photographing state, when the power button 8 of the apparatus body 2 is operated, the first barrel 11 is rotated around the optical axis by the drive force of the actuator 34. At this time, the actuator 34 (the drive motor) rotates in the opposite direction to the prior one. When the first barrel 11 rotates around the optical axis, the cam follower 19 slides in the photographing state forming portion 27 toward the second sliding portion 28 (refer to FIG. 19). When the cam follower 19 slides in the photographing state forming portion 27, the first barrel 11 rotates around the optical axis, but does not move in the optical axis direction; thus, the photographing state is maintained.

At this time, since the photographing state forming portion 27 is formed in a linear shape, the cam follower 19 slides easily in the photographing state forming portion 27 toward the second sliding portion 28, the cam follower 19 does not easily slide unintentionally into the first sliding portion 26 from the photographing state forming portion 27, and it is possible to achieve an improvement in the reliability of the transition operation from the photographing state to the collapsed state due to the simple structure.

Figure 20:
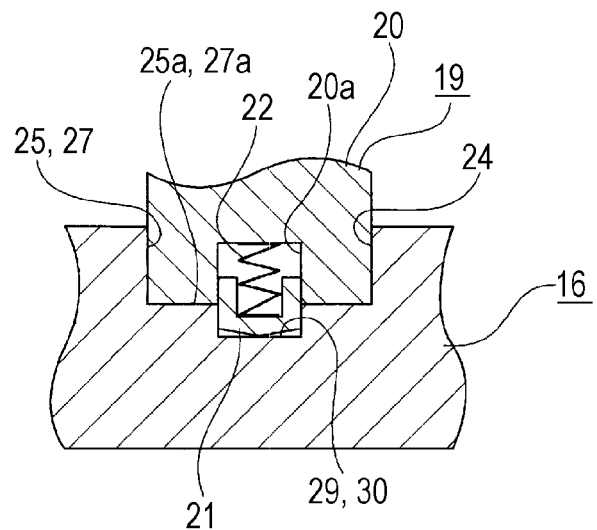
FIG. 20 is an enlarged cross-sectional view showing a state in which the guided portion of the cam follower is inserted in the guide portion.

When the cam follower 19 slides in the photographing state forming portion 27, since the cam follower 19 passes over the second guide portion 30 which is formed in the photographing state forming portion 27, the guided portion 21 protrudes from the spring disposition hole 20a due to the energizing force of the pushing spring 22 and is inserted into the second guide portion 30 (refer to FIG. 20).

When the cam follower 19 slides in the photographing state forming portion 27 in this manner, since the guided portion 21 is inserted into the second guide portion 30, the cam follower 19 does not slide unintentionally into the first sliding portion 26 from the photographing state forming portion 27, and it is possible to achieve a further improvement in the reliability of the transition operation from the photographing state to the collapsed state.

Since the cam follower 19 is provided with the pushing spring 22 which energizes the guided portion 21 in a direction in which the guided portion 21 is pushed into the bottom surface of the cam groove 24, the guided portion 21 is reliably inserted into the second guide portion 30 and guided, and it is possible to reliably perform the transition operation from the photographing state to the collapsed state.

When the cam follower 19 passes the second guide portion 30 and slides toward the second sliding portion 28, the guided portion 21 contacts the bottom surface 27a of the photographing state forming portion 27 and is re-inserted into the spring disposition hole 20a against the energizing force of the pushing spring 22.

Figure 21:
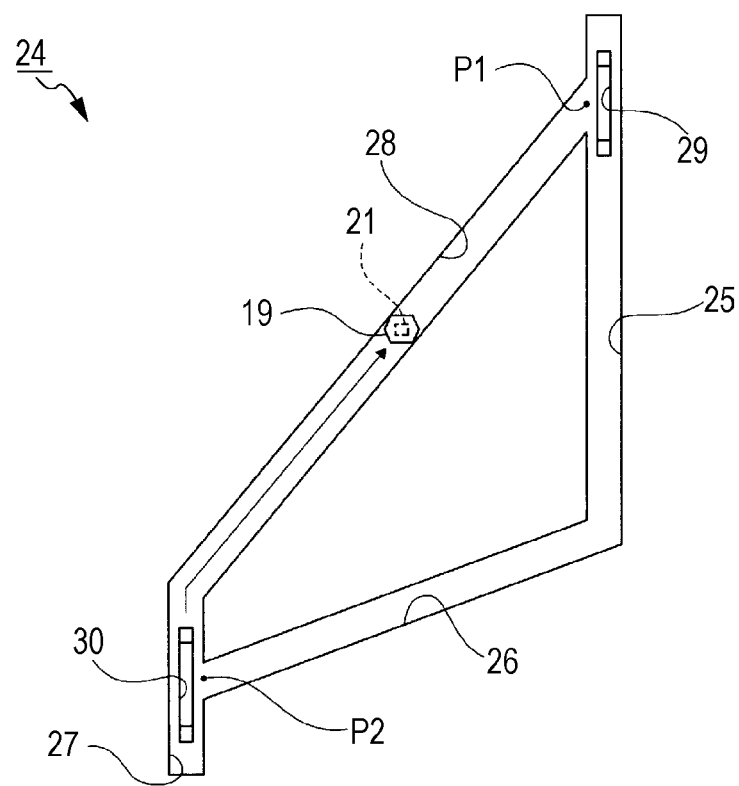
FIG. 21, continuing from FIG. 19, is a schematic view showing the engagement position of the cam follower in relation to the cam groove, in the middle of transitioning from the photographing state to the collapsed state.

Next, the cam follower 19 slides into the second sliding portion 28 from the photographing state forming portion 27 (refer to FIG. 21). When the cam follower 19 slides in the second sliding portion 28, the first barrel 11 moves backward (in the optical axis direction) at a lower speed in relation to the second barrel 16 than when sliding in the first sliding portion 26.

At this time, the first barrel 11 is energized by the spring member 18 in the opposite direction from the movement direction thereof; however, since the inclination angle of the second sliding portion 28 in relation to the optical axis is great, a smaller drive force of the actuator 34 is sufficient, and it is possible to cause the first barrel 11 to move backward using the drive force of the actuator 34, even against the energizing force of the spring member 18.

Figure 22:
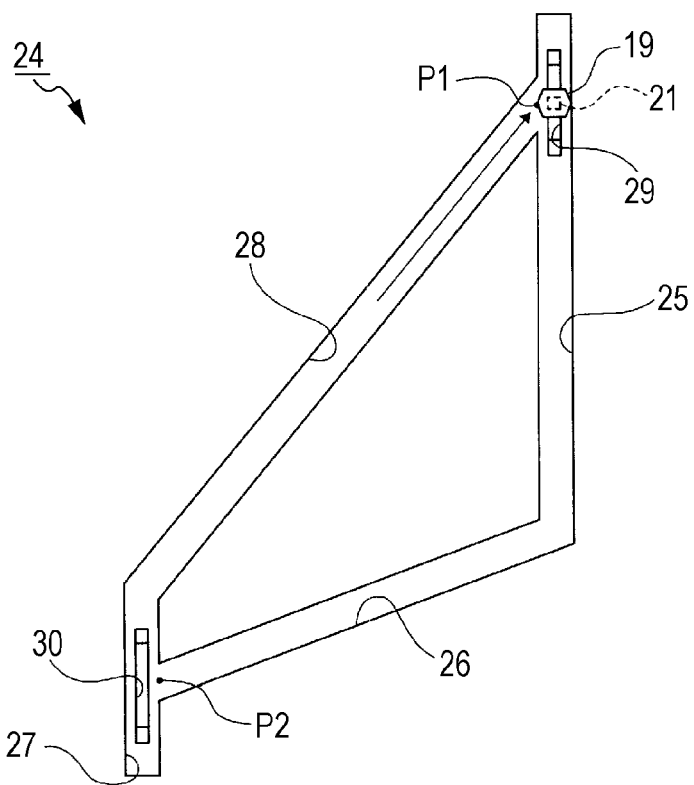
FIG. 22, continuing from FIG. 21, is a schematic view showing the engagement position of the cam follower in relation to the cam groove, after transitioning from the photographing state to the collapsed state.

The cam follower 19 of the first barrel 11 slides to the intersection P1 between the second sliding portion 28 and the collapsed state forming portion 25 (refer to FIG. 22). The cam follower 19 slides to the intersection P1, thereby transitioning to the collapsed state.

Figure 23:
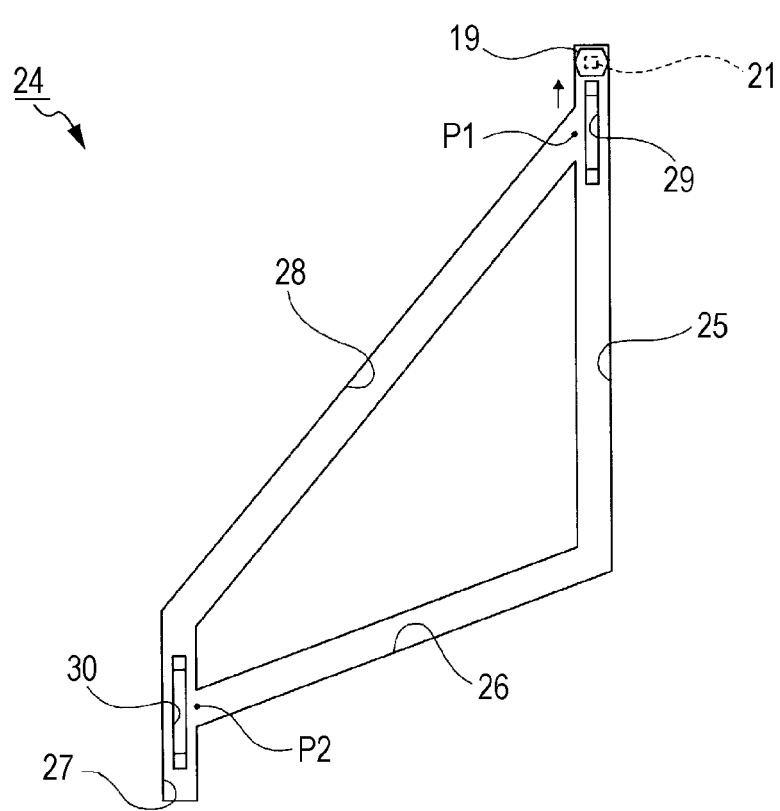
FIG. 23, continuing from FIG. 22, is a schematic view showing the engagement position of the cam follower in relation to the cam groove, when the photographing state is maintained and the rotation of an actuator is reversed.
Figure 24:
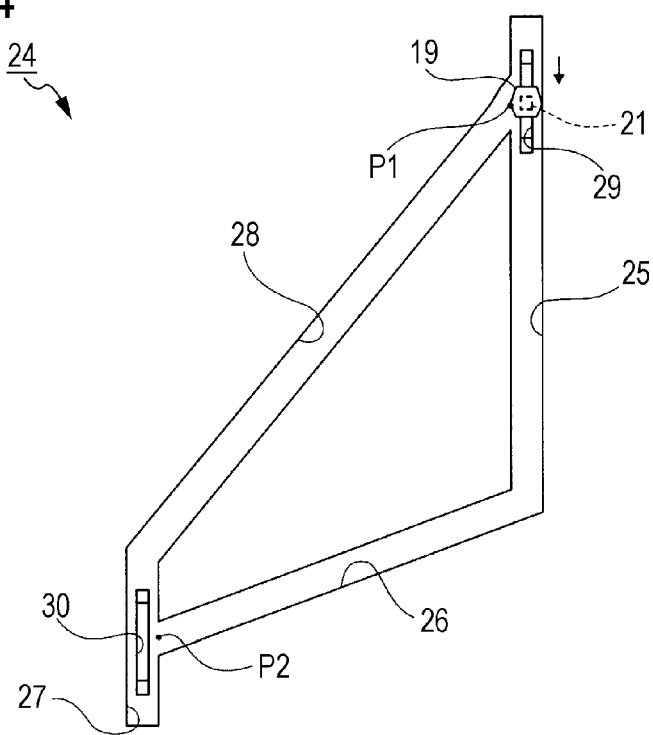
FIG. 24, continuing from FIG. 23, is a schematic view showing the engagement position of the cam follower in relation to the cam groove, when the guided portion is being guided by the guide portion.

Next, the cam follower 19 slides in collapsed state forming portion 25 to the end portion of the opposite side from the first sliding portion 26 side (refer to FIG. 23). When the cam follower 19 slides in the collapsed state forming portion 25, the first barrel 11 does not move in the optical axis direction.

When the cam follower 19 slides in collapsed state forming portion 25 to the end portion of the opposite side from the first sliding portion 26 side, the rotational direction of the actuator 34 is switched. Due to the rotational direction of the actuator 34 being switched, the cam follower 19 of the first barrel 11 slides in the collapsed state forming portion 25 toward the first sliding portion 26 (refer to FIG. 24). When the cam follower 19 slides in the collapsed state forming portion 25, the first barrel 11 rotates around the optical axis, but does not move in the optical axis direction; thus, the collapsed state is maintained.

At this time, since the collapsed state forming portion 25 is formed in a linear shape, the cam follower 19 slides easily in the collapsed state forming portion 25 toward the first sliding portion 26, the cam follower 19 does not easily slide unintentionally into the second sliding portion 28 from the collapsed state forming portion 25, and it is possible to achieve an improvement in the reliability of an operation of maintaining the collapsed state due to the simple structure.

When the cam follower 19 slides in the collapsed state forming portion 25, since the cam follower 19 passes over the first guide portion 29 which is formed in the collapsed state forming portion 25, the guided portion 21 protrudes from the spring disposition hole 20a due to the energizing force of the pushing spring 22 and is inserted into the first guide portion 29 (refer to FIG. 20).

When the cam follower 19 slides in the collapsed state forming portion 25 in this manner, since the guided portion 21 is inserted into the first guide portion 29, the cam follower 19 does not slide unintentionally into the second sliding portion 28 from the collapsed state forming portion 25, and it is possible to achieve a further improvement in the reliability of the operation of maintaining the collapsed state.

Since the cam follower 19 is provided with the pushing spring 22 which energizes the guided portion 21 in a direction in which the guided portion 21 is pushed into the bottom surface of the cam groove 24, the guided portion 21 is reliably inserted into the first guide portion 29 and guided, and it is possible to reliably perform the operation of maintaining the collapsed state.

When the cam follower 19 passes the first guide portion 29 and slides toward the first sliding portion 26, the guided portion 21 contacts the bottom surface 25a of the collapsed state forming portion 25 and is re-inserted into the spring disposition hole 20a against the energizing force of the pushing spring 22.

Next, the first barrel 11 is rotated by the drive force of the actuator 34, and the cam follower 19 slides to a position of the collapsed state forming portion 25 that is close to the first sliding portion 26; then, the rotation of the actuator 34 stops, the rotation of the first barrel 11 around the optical axis stops, and the cam follower 19 returns to the original position prior to the power being turned on (refer to FIG. 14).

Due to the cam follower 19 returning to the original position prior to the power being turned on, the lens barrel 3 is maintained in the collapsed state in which the first barrel 11 is incorporated in the second barrel 16 (refer to FIG. 12).

Other

In the above description, an example is shown in which the cam follower 19 is provided on the first barrel 11 and the cam groove 24 with which the cam follower 19 engages to slide freely is formed in the second barrel 16; however, conversely, the cam follower may be provided on the second barrel and the cam groove with which the cam follower engages to slide freely may be formed in the first barrel.

In the above description, the lens barrel 3 which is provided with two barrels, the first barrel 11 and the second barrel 16, is exemplified; however, the number of barrels is not limited to two and a configuration may be adopted in which three or more barrels are provided, and a first sliding portion and a second sliding portion with different inclination angles in relation to the optical axis are formed in the cam groove of one of the barrels.

In the above description, an example is shown in which the spring member 18 which is a compressed coil spring is used as the energizing portion which energizes the first barrel 11 forward; however, the energizing portion is not limited to a compressed coil spring, and another means such as a plate spring or rubber may also be used.

Figure 25:
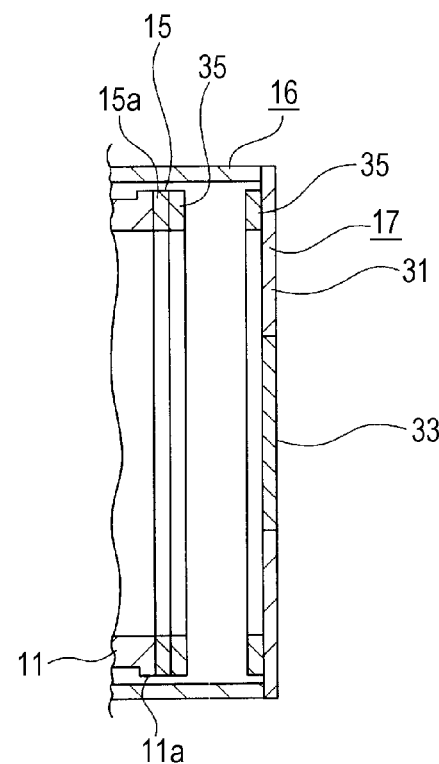
FIG. 25 is a schematic cross-sectional view showing an example in which a magnet is used as an energizing portion.

For example, magnets 35, 35 may be used as the energizing portion (refer to FIG. 25). The magnets 35, 35 are formed in an annular shape, are attached to the rear surface of the bearing ring 15 and the front surface of the base surface portion 31 in the rear barrel 17, respectively, and are disposed in a state in which the magnetic forces repel one another. The first barrel 11 is energized by the forces of the magnets 35, 35 which repel one another in a direction (forward) in which the first barrel 11 extends in relation to the second barrel 16.

By using the magnets 35, 35 as the energizing portion, the structure of the energizing portion is simple, and it is possible to achieve miniaturization of the actuator 34 and to reliably perform the transition from the collapsed state to the photographing state without causing a sharp rise in manufacturing costs.

Overview

As described above, in the imaging apparatus 1, the inclination angle of the first sliding portion 26 in the cam groove 24 in relation to the optical axis is smaller than the inclination angle of the second sliding portion 28 in relation to the optical axis. When transitioning from the collapsed state to the photographing state, the cam follower 19 slides in the first sliding portion 26, and the first barrel 11 extends in relation to the second barrel 16. When transitioning from the photographing state to the collapsed state, the cam follower 19 slides in the second sliding portion 28, and the first barrel 11 is incorporated in the second barrel 16.

Therefore, the time taken when transitioning from the collapsed state to the photographing state is reduced, and the necessary drive force of the actuator 34 when transitioning from the photographing state to the collapsed state is less than the necessary drive force of the actuator 34 when transitioning from the collapsed state to the photographing state; thus, it is possible to achieve a reduction in startup time in addition to reducing the load on the actuator 34 to a minimum.

Embodiment of Imaging Apparatus

FIG. 26 shows a block diagram of a still camera (a digital still camera) according to an embodiment of the imaging apparatus of the present disclosure.

An imaging apparatus (the digital still camera) 100 (the imaging apparatus 1) includes a camera block 50 which handles the imaging function, a camera signal processing unit 51 which performs signal processing such as analogue-digital conversion of a photographed image signal or the like, and an image processing unit 52 which performs recording and reproduction processes of the image signal. The imaging apparatus 100 is provided with a display unit 53 (the display 9) such as a Liquid Crystal Display (LCD) which displays a photographed image or the like, a reader and writer (R/W) 54 which performs writing and reading of an image signal to and from a memory card 1000, a Central Processing Unit (CPU) 55 which performs the overall control of the imaging apparatus 100, an input unit 56 which is formed of various switches or the like (the shutter button 6, the zoom switch 7, and the operation portions 10, 10, . . . ) with which the necessary operations are performed by the user, and a lens drive control unit 57 which controls the driving of the lenses which are disposed in the camera block 50.

The camera block 50 includes an optical system containing a lens group 58, and an imaging device 59 (the imaging device 33) such as a Charge Coupled Device (CCD) or a Complementary Metal-Oxide Semiconductor (CMOS).

The camera signal processing unit 51 performs various signal processing such as conversion of the output signal from the imaging device 59 into a digital signal, noise removal, image correction, and conversion to a luminance or color difference signal.

The image processing unit 52 performs processes such as data specification conversion of compression encoding and decompression decoding processes, resolution or the like of the image signal on the basis of a predetermined image data format.

The display unit 53 has a function of displaying various data such as the operation state in relation to the input unit 56 of the user, a photographed image or the like.

The R/W 54 performs the writing of the image data which is encoded by the image processing unit 52 to the memory card 1000, and the reading of the image data which is recorded in the memory card 1000.

The CPU 55 functions as a control processing unit which controls each circuit block that is provided in the imaging apparatus 100, and controls each circuit block on the basis of a command input signal or the like from the input unit 56.

The input unit 56 includes a shutter release button for performing a shutter operation, a selection switch for selecting the operation mode and the like, and outputs a command input signal corresponding to the operation by the user to the CPU 55.

The lens drive control unit 57 controls a motor or the like (not shown) which drives each lens of the lens group 58 on the basis of the control signal from the CPU 55.

The memory card 1000 is semiconductor memory which can be attached and detached in relation to a slot connected to the R/W 54.

Hereinafter, description will be given of the operations of the imaging apparatus 100.

In a photography standby state, under the control of the CPU 55, the image signal which is photographed in the camera block 50 is output to the display unit 53 via the camera signal processing unit 51 and is displayed as a live preview image. When the command input signal for zooming is input from the input unit 56, the CPU 55 outputs a control signal to the lens drive control unit 57 and a predetermined lens of the lens group 58 is moved based on the control of the lens drive control unit 57.

When the shutter (not shown) of the camera block 50 is operated according to the command input signal from the input unit 56, the photographed image signal is output from the camera signal processing unit 51 to the image processing unit 52, is subjected to a compression encoding process, and is converted into digital data of a predetermined data format. The converted data is output to the R/W 54 and is written to the memory card 1000.

When the shutter release button of the input unit 56 is half pressed or is fully pressed for recording (photographing), the focusing is performed by the lens drive control unit 57 causing a predetermined lens of the lens group 58 to move on the basis of the control signal from the CPU 55.

When the image data that is recorded in the memory card 1000 is reproduced, according to the operation of the input unit 56, predetermined image data is read from the memory card 1000 by the R/W 54 and subjected to a decompression decoding process by the image processing unit 52; subsequently, the reproduced image signal is output to the display unit 53 and the reproduced image is displayed.

Present Disclosure

The present disclosure may adopt the following configurations:

(1) A lens barrel capable of expanding and contracting between a collapsed state in which an optical path is shortest and a photographing state in which the optical path is longer than in the collapsed state includes a first barrel which is rotated around an optical axis by an actuator; and a second barrel which supports the first barrel to slide freely around the optical axis and to be capable of moving in an optical axis direction. One of the first barrel and the second barrel is provided with a cam follower, and a cam groove with which the cam follower engages to slide freely is formed in the other. When the first barrel rotates around the optical axis, the cam follower slides in the cam groove, thereby allowing the first barrel to move in the optical axis direction in relation to the second barrel. The cam groove includes a first sliding portion and a second sliding portion which are both inclined in relation to the optical axis, and an inclination angle of the first sliding portion in relation to the optical axis is smaller than an inclination angle of the second sliding portion in relation to the optical axis. When transitioning from the collapsed state to the photographing state, the cam follower slides on the first sliding portion and the first barrel extends in relation to the second barrel. When transitioning from the photographing state to the collapsed state, the cam follower slides on the second sliding portion and the first barrel is incorporated in the second barrel.

(2) The lens barrel according to (1), further includes an energizing portion which energizes the first barrel in a direction in which the first barrel extends in relation to the second barrel.

(3) In the lens barrel according (2), a spring member is used as the energizing portion.

(4) In the lens barrel according to (2), a magnet is used as the energizing portion.

(5) In the lens barrel according to any of (1) to (4), a photographing state forming portion, which extends in a direction orthogonal to the optical axis and with which the cam follower engages in the photographing state, is formed in the cam groove. An intersection with the first sliding portion is formed in a middle portion of the photographing state forming portion. An intersection with the second sliding portion is formed on an end portion of the photographing state forming portion.

(6) In the lens barrel according to any of (1) to (5), a collapsed state forming portion, which extends in a direction orthogonal to the optical axis and with which the cam follower engages in the collapsed state, is formed in the cam groove. An intersection with the second sliding portion is formed in a middle portion of the collapsed state forming portion. An intersection with the first sliding portion is formed on an end portion of the collapsed state forming portion.

(7) In the lens barrel according to any of (1) to (6), a photographing state forming portion, which extends in a direction orthogonal to the optical axis and with which the cam follower engages in the photographing state, is formed in the cam groove. An intersection with the first sliding portion is formed in a middle portion of the photographing state forming portion. An intersection with the second sliding portion is formed on an end portion of the photographing state forming portion. In a bottom surface of the photographing state forming portion, a groove-shaped guide portion is formed at a position crossing the intersection with the first sliding portion. A guided portion is provided in the cam follower to be capable of moving in a depth direction of the cam groove. When the cam follower slides in the photographing state forming portion toward the second sliding portion, the guided portion is inserted into the guide portion and slides.

(8) The lens barrel according to (7), further includes a pushing spring which energizes the guided portion in a direction in which the guided portion is pushed against a bottom surface of the cam groove.

(9) In the lens barrel according to any of (1) to (8), a collapsed state forming portion, which extends in a direction orthogonal to the optical axis and with which the cam follower engages in the collapsed state, is formed in the cam groove. An intersection with the second sliding portion is formed in a middle portion of the collapsed state forming portion. An intersection with the first sliding portion is formed on an end portion of the collapsed state forming portion. In a bottom surface of the collapsed state forming portion, a groove-shaped guide portion is formed at a position crossing the intersection with the second sliding portion. A guided portion is provided in the cam follower to be capable of moving in a depth direction of the cam groove. When the cam follower slides in the collapsed state forming portion toward the first sliding portion, the guided portion is inserted into the guide portion and slides.

(10) The lens barrel according to (9), further includes a pushing spring which energizes the guided portion in a direction in which the guided portion is pushed against a bottom surface of the cam groove.

(11) An imaging apparatus includes a lens barrel, in an inner portion of which a photographic optical system is disposed, and an imaging device which converts an optical image that is acquired via the photographic optical system into an electrical signal. The lens barrel capable of expanding and contracting between a collapsed state in which an optical path is shortest and a photographing state in which the optical path is longer than in the collapsed state includes a first barrel which is rotated around an optical axis by an actuator; and a second barrel which supports the first barrel to slide freely around the optical axis and to be capable of moving in an optical axis direction. One of the first barrel and the second barrel is provided with a cam follower, and a cam groove with which the cam follower engages to slide freely is formed in the other. When the first barrel rotates around the optical axis, the cam follower slides in the cam groove, thereby allowing the first barrel to move in the optical axis direction in relation to the second barrel. The cam groove includes a first sliding portion and a second sliding portion which are both inclined in relation to the optical axis, and an inclination angle of the first sliding portion in relation to the optical axis is smaller than an inclination angle of the second sliding portion in relation to the optical axis. When transitioning from the collapsed state to the photographing state, the cam follower slides on the first sliding portion and the first barrel extends in relation to the second barrel. When transitioning from the photographing state to the collapsed state, the cam follower slides on the second sliding portion and the first barrel is incorporated in the second barrel.

It should be understood by those skilled in the art that various modifications, combinations, sub-combinations and alterations may occur depending on design requirements and other factors insofar as they are within the scope of the appended claims or the equivalents thereof.

What is claimed is:

1. A lens barrel configured to expand and contract between a collapsed state in which an optical path is shortest and a photographing state in which the optical path is longer than in the collapsed state, comprising:

a first barrel configured to rotate around an optical axis by an actuator; and a second barrel configured to support the first barrel to slide freely around the optical axis and to move in an optical axis direction, wherein one of the first barrel and the second barrel is provided with a cam follower, and a cam groove with which the cam follower is configured to engage to slide freely is formed in the other, wherein, in an event the first barrel rotates around the optical axis, the cam follower is configured to slide in the cam groove and to allow the first barrel to move in the optical axis direction in relation to the second barrel, wherein the cam groove includes a first sliding portion and a second sliding portion which are both inclined in relation to the optical axis, and an inclination angle of the first sliding portion in relation to the optical axis is smaller than an inclination angle of the second sliding portion in relation to the optical axis, wherein, in an event of transitioning from the collapsed state to the photographing state, the cam follower is configured to slide on the first sliding portion and the first barrel is configured to extend in relation to the second barrel, wherein, in an event of transitioning from the photographing state to the collapsed state, the cam follower is configured to slide on the second sliding portion and the first barrel is configured to be incorporated in the second barrel, wherein a photographing state forming portion configured to be extended in a direction orthogonal to the optical axis and with which the cam follower is configured to be engaged in the photographing state, is formed in the cam groove, wherein an intersection with the first sliding portion is formed in a middle portion of the photographing state forming portion, and wherein an intersection with the second sliding portion is formed on an end portion of the photographing state forming portion.

2. The lens barrel according to claim 1, further comprising an energizing portion configured to energize the first barrel in a direction in which the first barrel extends in relation to the second barrel.

3. The lens barrel according to claim 2, wherein a spring member is used as the energizing portion.

4. The lens barrel according to claim 2, wherein a magnet is used as the energizing portion.

5. The lens barrel according to claim 1, wherein a collapsed state forming portion configured to be extended in a direction orthogonal to the optical axis and with which the cam follower is configured to be engaged in the collapsed state, is formed in the cam groove, wherein an intersection with the second sliding portion is formed in a middle portion of the collapsed state forming portion, and wherein an intersection with the first sliding portion is formed on an end portion of the collapsed state forming portion.

6. The lens barrel according to claim 1, wherein, in a bottom surface of the photographing state forming portion, a groove-shaped guide portion is formed at a position crossing the intersection with the first sliding portion, wherein a guided portion is provided in the cam follower to move in a depth direction of the cam groove, and wherein, in an event the cam follower slides in the photographing state forming portion toward the second sliding portion, the guided portion is configured to be inserted into the guide portion and slide.

7. The lens barrel according to claim 6, further comprising a pushing spring configured to energize the guided portion in a direction in which the guided portion is configured to be pushed against a bottom surface of the cam groove.

8. The lens barrel according to claim 1, wherein a collapsed state forming portion configured to be extended in a direction orthogonal to the optical axis and with which the cam follower is configured to be engaged in the collapsed state, is formed in the cam groove, wherein an intersection with the second sliding portion is formed in a middle portion of the collapsed state forming portion, wherein an intersection with the first sliding portion is formed on an end portion of the collapsed state forming portion, wherein, in a bottom surface of the collapsed state forming portion, a groove-shaped guide portion is formed at a position crossing the intersection with the second sliding portion, wherein a guided portion is provided in the cam follower to move in a depth direction of the cam groove, and wherein, in an event the cam follower slides in the collapsed state forming portion toward the first sliding portion, the guided portion is configured to be inserted into the guide portion and slide.

9. The lens barrel according to claim 8, further comprising a pushing spring configured to energize the guided portion in a direction in which the guided portion is configured to be pushed against a bottom surface of the cam groove.

10. An imaging apparatus, comprising:

a lens barrel, in an inner portion of which a photographic optical system is disposed; and an imaging device configured to convert an optical image that is acquired via the photographic optical system into an electrical signal, wherein the lens barrel is configured to expand and contract between a collapsed state in which an optical path is shortest and a photographing state in which the optical path is longer than in the collapsed state, wherein the lens barrel includes:

a first barrel configured to rotate around an optical axis by an actuator; and a second barrel configured to support the first barrel to slide freely around the optical axis and to move in an optical axis direction, wherein one of the first barrel and the second barrel is provided with a cam follower, and a cam groove with which the cam follower is configured to engage to slide freely is formed in the other, wherein, in an event the first barrel rotates around the optical axis, the cam follower is configured to slide in the cam groove and to allow the first barrel to move in the optical axis direction in relation to the second barrel, wherein the cam groove includes a first sliding portion and a second sliding portion which are both inclined in relation to the optical axis, and an inclination angle of the first sliding portion in relation to the optical axis is smaller than an inclination angle of the second sliding portion in relation to the optical axis, wherein, in an event of transitioning from the collapsed state to the photographing state, the cam follower is configured to slide on the first sliding portion and the first barrel is configured to extend in relation to the second barrel, wherein, in an event of transitioning from the photographing state to the collapsed state, the cam follower is configured to slide on the second sliding portion and the first barrel is configured to incorporate in the second barrel, wherein a photographing state forming portion configured to be extended in a direction orthogonal to the optical axis and with which the cam follower is configured to be engaged in the photographing state, is formed in the cam groove, wherein an intersection with the first sliding portion is formed in a middle portion of the photographing state forming portion, and wherein an intersection with the second sliding portion is formed on an end portion of the photographing state forming portion.

11. A lens barrel configured to expand and contract between a collapsed state in which an optical path is shortest and a photographing state in which the optical path is longer than in the collapsed state, comprising:

a first barrel configured to rotate around an optical axis by an actuator; and a second barrel configured to support the first barrel to slide freely around the optical axis and to move in an optical axis direction, wherein one of the first barrel and the second barrel is provided with a cam follower, and a cam groove with which the cam follower is configured to engage to slide freely is formed in the other, wherein, in an event the first barrel rotates around the optical axis, the cam follower is configured to slide in the cam groove and to allow the first barrel to move in the optical axis direction in relation to the second barrel, wherein the cam groove includes a first sliding portion which continues from an end portion of a collapsed state forming portion to a photographing state forming portion and a second sliding portion which are both inclined in relation to the optical axis, and an inclination angle of the first sliding portion in relation to the optical axis is smaller than an inclination angle of the second sliding portion in relation to the optical axis, wherein, in an event of transitioning from the collapsed state to the photographing state, the cam follower is configured to slide on the first sliding portion and the first barrel is configured to extend in relation to the second barrel, wherein, in an event of transitioning from the photographing state to the collapsed state, the cam follower is configured to slide on the second sliding portion and the first barrel is configured to incorporate in the second barrel, wherein a collapsed state forming portion configured to be extended in a direction orthogonal to the optical axis and with which the cam follower is configured to be engaged in the collapsed state, is formed in the cam groove, wherein an intersection with the second sliding portion is formed in a middle portion of the collapsed state forming portion, and wherein an intersection with the first sliding portion is formed on an end portion of the collapsed state forming portion.

\* \* \* \* \*